(12) United States Patent
Kasahara et al.

(10) Patent No.: US 8,438,359 B2
(45) Date of Patent: May 7, 2013

(54) MEMORY MANAGEMENT METHOD, INFORMATION PROCESSING DEVICE, PROGRAM CREATION METHOD, AND PROGRAM

(75) Inventors: Hironori Kasahara, Tokyo (JP); Keiji Kimura, Tokyo (JP); Hirofumi Nakano, Tokyo (JP); Takumi Nito, Tokyo (JP); Takanori Maruyama, Tokyo (JP); Tsuyoshi Miura, Tokyo (JP); Tomohiro Tagawa, Tokyo (JP)

(73) Assignee: Waseda University, Tokyo (JP)

( * ) Notice: Subject to any disclaimer, the term of this patent is extended or adjusted under 35 U.S.C. 154(b) by 608 days.

(21) Appl. No.: 12/525,404

(22) PCT Filed: Feb. 27, 2008

(86) PCT No.: PCT/JP2008/053891
§ 371 (c)(1),
(2), (4) Date: Mar. 3, 2010

(87) PCT Pub. No.: WO2008/105558
PCT Pub. Date: Sep. 4, 2008

(65) Prior Publication Data
US 2010/0174876 A1    Jul. 8, 2010

(30) Foreign Application Priority Data
Feb. 28, 2007   (JP) ................. 2007-050269

(51) Int. Cl.
*G06F 12/00*   (2006.01)
*G06F 13/00*   (2006.01)

(52) U.S. Cl.
USPC ........... 711/170; 711/129; 711/153; 711/171; 711/172; 711/173

(58) Field of Classification Search .................. 711/129, 711/153, 170, 171, 172, 173
See application file for complete search history.

(56) References Cited

U.S. PATENT DOCUMENTS
6,088,777 A      7/2000  Sorber
2005/0268049 A1  12/2005 De Lange

FOREIGN PATENT DOCUMENTS
| | | |
|---|---|---|
| CN | 1679005 A | 10/2005 |
| JP | 2001-175619 A | 6/2001 |
| JP | 2003-15883 A | 1/2003 |
| WO | 2004/021193 A1 | 3/2004 |
| WO | 2005/081113 A3 | 9/2005 |

OTHER PUBLICATIONS
A. Yoshida et al., A Near-Fine-Grain Task Scheduling Scheme for Multi-Grain Data-Localization, IEICE Technical Report, Aug. 27, 1996, vol. 96, pp. 71-78.
A. Yoshida et al., A Data-Localization Scheme among Doall/Sequential Loops of Fortran Coarse-Grain Parallel Processing, The Transactions of the Institute of Electronics, Information and Communication Engineers D-I, No. 2, Feb. 25, 1995, vol. J-78-D-I, pp. 162-169.

*Primary Examiner* — Midys Rojas
(74) *Attorney, Agent, or Firm* — Mattingly & Malur, PC

(57) ABSTRACT

Provided is a method for managing a memory storage region used by a processor. The processor is connected to the memory that stores data accessed while a task is being executed. The memory management method including the steps of: dividing the memory area of the memory into blocks having a plurality of different sizes; selecting a block having a size matching a size of the data accessed while the task is being executed; and storing the data accessed while the task is being executed in the selected block.

17 Claims, 50 Drawing Sheets

(STATUS 1)

(STATUS 2)

(STATUS 2)

(STATUS 3)

(STATUS 3)

(STATUS 4)

(STATUS 4)

(STATUS 5)

*Fig. 23B*

```
integer a(128), b(128), c(128)
         d(128), e(128)
Integer LM(1024)
Integer templ(128, 0:7)
EQUIVALENCE(LM, templ)
Do i = 1, 128
   templ(i, 0) =
   templ(i, 1) =
   templ(i, 2) =
Enddo
Store templ(1:128, 0)→a(1:128)
Do i = 1, 128
   templ(i, 0) =
   templ(i, 3) = templ(i, 1) +
         templ(i, 2) + temp(i, 0)
enddo
call sub1(e)
Do i = 1, 128
   d(i) = d(i) + c(i)
enddo
call sub1(a)
```

```
Subroutine sub1(x)
integer x(128), y(128)
Do i = 1, 128
   y(i) = x(i)
enddo Do i = 1, 128
   x (i) = y(129 - i)
enddo
end
```

(STATUS 5)

(STATUS 6)

(STATUS 6)

(STATUS 7)

*Fig. 25B*

```
integer a(128), b(128), c(128)
        d(128), e(128)
Integer LM(1024)
Integer templ(128, 0:7)
COMMON/templ/templ
COMMON/block_no/block_no1
EQUIVALENCE(LM, templ)
```

```
Do i = 1, 128
    templ(i, 0) =
    templ(i, 1) =
    templ(i, 2) =
Enddo
```
Store templ(1:128, 0)→a(1:128)

```
Do i = 1, 128
    templ(i, 0) =
    templ(i, 3) = templ(i, 1) +
            templ(i, 2) + temp(i, 0)
enddo
``` call sub1(e)

```
Do i = 1, 128
    d(i) = d(i) + c(i)
enddo
``` call sub1(a)

```
Subroutine sub1(x)
integer x(128), y(128)
Integer templ(128, 0:7)
COMMON/templ/templ
COMMON/block_no/block_no1
Do i = 1, 128
    templ(i, block_no1) = x(i)
enddo Do i = 1, 128
    x (i) = templ(129 - i, block_no1)
enddo
end
```

(STATUS 7)

(STATUS 8)

(STATUS 8)

(STATUS 9)

Fig. 27B

```
integer a(128), b(128), c(128)
         d(128), e(128)
Integer LM(1024)
Integer templ(128, 0:7)
COMMON/templ/templ
COMMON/block_no/block_no1
EQUIVALENCE(LM, templ)
Do i = 1, 128
    templ(i, 0) =
    templ(i, 1) =
    templ(i, 2) =
Enddo
Store templ(1:128, 0)→a(1:128)
Do i = 1, 128
    templ(i, 0) =
    templ(i, 3) = templ(i, 1) +
           templ(i, 2) + temp(i, 0)
Enddo
Store templ(1:128, 3)→b(1:128)
block_no1 = 1
⇨ call sub1(e)
Do i = 1, 128
    d(i) = d(i) + c(i)
enddo
call sub1(a)
```

```
Subroutine sub1(x)
integer x(128), y(128)
Integer templ(128, 0:7)
COMMON/templ/templ
COMMON/block_no/block_no1
Do i = 1, 128
    templ(i, block_no1) = x(i)
enddo Do i = 1, 128
    x (i) = templ(129 - i, block_no1)
enddo
end
```

(STATUS 9)

(STATUS 10)

(STATUS 11)

Fig. 29B

```
integer a(128), b(128), c(128)
          d(128), e(128)
Integer LM(1024)
Integer templ(128, 0:7)
COMMON/templ/templ
COMMON/block_no/block_no1
EQUIVALENCE(LM, templ)
```
```
Do i = 1, 128
    templ(i, 0) =
    templ(i, 1) =
    templ(i, 2) =
Enddo
```
```
Store templ(1:128, 0)→a(1:128)
```
```
Do i = 1, 128
    templ(i, 0) =
    templ(i, 3) = templ(i, 1) +
            templ(i, 2) + temp(i, 0)
Enddo
```
```
Store templ(1:128, 3)→b(1:128)
block_no1 = 1
```
```
call sub1(templ(1, 3))
```
⇒
```
Do i = 1, 128
    d(i) = d(i) + c(i)
enddo
call sub1(a)
```

```
Subroutine sub1(x)
integer x(128), y(128)
Integer templ(128, 0:7)
COMMON/templ/templ
COMMON/block_no/block_no1
Do i = 1, 128
    templ(i, block_no1) = x(i)
enddo Do i = 1, 128
    x(i) = templ(129 - i, block_no1)
enddo
end
```

(STATUS 11)

(STATUS 12)

(STATUS 13)

Fig. 31B

```
integer a(128), b(128), c(128)
         d(128), e(128)
Integer LM(1024)
Integer templ(128, 0:7)
COMMON/templ/templ
COMMON/block_no/block_no1
EQUIVALENCE(LM, templ)
Do i = 1, 128
   templ(i, 0) =
   templ(i, 1) =
   templ(i, 2) =
Enddo
Store templ(1:128, 0)→a(1:128)
Do i = 1, 128
   templ(i, 0) =
   templ(i, 3) = templ(i, 1) +
            templ(i, 2) + temp(i, 0)
Enddo
Store templ(1:128, 3)→b(1:128)
block_no1 = 1
call sub1(templ(1, 3))
Do i = 1, 128
   templ(i, 0) = templ(i, 0) + templ(i, 2)
Enddo
Store templ(1:128, 0)→d(1:128)
Load a(1:128) → templ(1:128, 1)
call sub1(templ(1, 1)
```

```
Subroutine sub1(x)
integer x(128), y(128)
Integer templ(128, 0:7)
COMMON/templ/templ
COMMON/block_no/block_no1
Do i = 1, 128
   templ(i, block_no1) = x(i)
enddo Do i = 1, 128
   x (i) = templ(129 - i, block_no1)
enddo
end
```

(STATUS 13)

(STATUS 14)

Fig. 32B

```
integer a(128), b(128), c(128)
         d(128), e(128)
Integer LM(1024)
Integer templ(128, 0:7)
COMMON/templ/templ
COMMON/block_no/block_no1
EQUIVALENCE(LM, templ)
Do i = 1, 128
    templ(i, 0) =
    templ(i, 1) =
    templ(i, 2) =
Enddo
Store templ(1:128, 0)→a(1:128)
Do i = 1, 128
    templ(i, 0) =
    templ(i, 3) = templ(i, 1) +
            templ(i, 2) + temp(i, 0)
Enddo
Store templ(1:128, 3)→b(1:128)
block_no1 = 1
call sub1(templ(1, 3))
Do i = 1, 128
    templ(i, 0) = templ(i, 0) + templ(i, 2)
Enddo
Store templ(1:128, 0)→d(1:128)
Load a(1:128) → templ(1:128, 1)
block_no1 = 0
call sub1(templ(1, 1))
```

```
Subroutine sub1(x)
integer x(128), y(128)
Integer templ(128, 0:7)
COMMON/templ/templ
COMMON/block_no/block_no1
Do i = 1, 128
    templ(i, block_no1) = x(i)
enddo Do i = 1, 128
    x (i) = templ(129 - i, block_no1)
enddo
end
```

(STATUS 14)

(STATUS 15)

Fig. 33B

```
integer a(128), b(128), c(128)
         d(128), e(128)
Integer LM(1024)
Integer templ(128, 0:7)
COMMON/templ/templ
COMMON/block_no/block_no1
EQUIVALENCE(LM, templ)
Do i = 1, 128
    templ(i, 0) =
    templ(i, 1) =
    templ(i, 2) =
Enddo
Store templ(1:128, 0)→a(1:128)
Do i = 1, 128
    templ(i, 0) =
    templ(i, 3) = templ(i, 1) +
             templ(i, 2) + temp(i, 0)
Enddo
Store templ(1:128, 3)→b(1:128)
block_no1 = 1
call sub1(templ(1, 3))
Do i = 1, 128
    templ(i, 0) = templ(i, 0) + templ(i, 2)
Enddo
Store templ(1:128, 0)→d(1:128)
Load a(1:128) → templ(1:128, 1)
block_no1 = 0
call sub1(templ(1, 1))
```

```
                        a(1:128)
Subroutine sub1(x)    a(128)
integer x(128), y(128)
Integer templ(128, 0:7)
COMMON/templ/templ              0
COMMON/block_no/block_no1
Do i = 1, 128          0    a(i)
    templ(i, block_no1) = x(i)
enddo 0
Do i = 1, 128
    x (i) = templ(129 - i, block_no1)
enddo    a(i)
end
```

(STATUS 15)

(STATUS 16)

*Fig. 34B*

| | |
|---|---|
| integer a(128), b(128), c(128)<br>        d(128), e(128)<br>Integer LM(1024)<br>Integer templ(128, 0:7)<br>COMMON/templ/templ<br>COMMON/block_no/block_no1<br>EQUIVALENCE(LM, templ)<br>Do i = 1, 128<br>   templ(i, 0) =<br>   templ(i, 1) =<br>   templ(i, 2) =<br>Enddo<br>Store templ(1:128, 0)→a(1:128)<br>Do i = 1, 128<br>   templ(i, 0) =<br>   templ(i, 3) = templ(i, 1) +<br>       templ(i, 2) + temp(i, 0)<br>Enddo<br>Store templ(1:128, 3)→b(1:128)<br>block_no1 = 1<br>call sub1(templ(1, 3))<br>Do i = 1, 128<br>   templ(i, 0) = templ(i, 0) + templ(i, 2)<br>Enddo<br>Store templ(1:128, 0)→d(1:128)<br>Load a(1:128) → templ(1:128, 1)<br>block_no1 = 0<br>call sub1(templ(1, 1)) | Subroutine sub1(x)<br>integer x(128), y(128)<br>Integer templ(128, 0:7)<br>COMMON/templ/templ<br>COMMON/block_no/block_no1<br>Do i = 1, 128<br>   templ(i, block_no1) = x(i)<br>enddo<br><br>Do i = 1, 128<br>   x (i) = templ(129 - i, block_no1)<br>enddo<br>end |

(STATUS 16)

(SIMILAR PROCESSING CONTINUES SUBSEQUENTLY)

MEMORY MANAGEMENT METHOD, INFORMATION PROCESSING DEVICE, PROGRAM CREATION METHOD, AND PROGRAM

TECHNICAL FIELD

This invention relates to a management method for a memory in a multi-processor system including a plurality of processor cores, and more particularly, to a method of assigning, based on information obtained by a compiler, data accessed by a processor to areas obtained by dividing a memory.

BACKGROUND ART

Multi-core processors (chip multi-processors) in which a plurality of processor cores are integrated on one chip have been released one after another from respective microprocessor manufacturers. In the fields of information home electric appliances and device embedding (such as cellular phones, game machines, car navigation systems, digital television receivers, HDD/DVD recorders/players), as well as in the fields of super computers, servers, desktop computers, and PC servers, there is a trend toward employment of multi-core microprocessors.

In this way, the multi-core processors are used at present in most of information devices ranging from the information home electric appliances to the super computers, and it is expected that the multi-core processor will be integrated into more information devices in the future.

The multi-core processor can utilize not only parallelism on the fine grain instruction level, but also parallelism on the loop level having larger parallelism, parallelism between loops with coarser granularity, and rough grain task parallelism between functions. In this way, the multi-core processor is advantageous in, by using larger parallelism, increasing processing performance of a processor. Moreover, the multi-core processor can attain the same performance by using n processor cores, and hence, by decreasing the clock frequency to one n-th and by decreasing a voltage to be applied, the multi-core processor is also advantageous in capability of keeping power consumption (which increases with the square of the voltage) low.

Moreover, in terms of software, parallel programming for the multi-core processor usually requires a large amount of time for tuning, and, thus, development of application software is troublesome. However, a relatively small number of processors are presently integrated, and hence it is possible to obtain a high performance by means of an automatic parallelizing compiler which automatically parallelizes a sequential program. In the field of the information home electric appliances, quality and the number of applications determine competitiveness in the market, and hence, when the automatic parallelizing of a program for four-core, eight-core, and sixteen-core multi-processor is possible by a compiler, advantage of multi-core configuration increases.

Moreover, as multi-grain parallelizing, a technology of, by combining all parallelisms such as those on a statement-level, a loop-level, and a more coarse level (such as between loops, between subroutines, and between basic blocks), by means of the earliest executable condition analysis, for extracting a parallelism is disclosed in JP 2001-175619 A.

DISCLOSURE OF THE INVENTION

Such optimization of a local memory has been carried out conventionally. However, according to a conventional optimization of a local memory, when parallel loops are successively appearing, by simply successively executing the loops which can be executed in parallel, data on a memory are simply reused.

However, a data size used by one loop is often larger than the size of a local memory, and loading and storing data occur in the loop. On this occasion, a processor has to suspend processing until data used next is ready, and, thus, an overhead of the processing caused by the processor occurs.

Moreover, according to data localization in which a program is executed while data on a local memory is being used, processing is carried out using only the local memory, and hence it is necessary to store large data used by a sequential loop and a basic block in the local memory. Data which cannot be loaded on the local memory is stored in a shared memory. Thus, it is desirable to apply localization of data across the entire program.

Moreover, for static scheduling and generating a dynamic scheduling code, local memories on respective processors or distributed shared memories are efficiently used, and for minimizing data transfer overhead between the processors, data localization is also used.

Further, as the scale of integrity of a processor increases, and the number of cores contained in one chip increases, even when a program is parallelized, the processing performance does not increase accordingly. This is because, even when an operation of the processor becomes fast, due to an increase in difference between a processing speed and a memory access speed of the processor, there arises a problem of a memory wall in which data to be used by the processor cannot be supplied in a proper timing to the memory.

Thus, it is necessary to skillfully use a memory provided close to the processor. In other words, memory capacity of the memory close to the processor is small, and hence when large data is necessary, the data should be divided for loading in the memory. Moreover, data transfer between memories takes time, and hence in order to reuse the data on the memory, scheduling devised in terms of processing sequence of a program is necessary. Further, when data is transferred between memories, a DMA controller needs to be used to hide the overhead.

The compiler, upon analyzing parallelism in a program to be executed by the processor, obtains information on a sequence of execution of tasks in the program, and also analyzes dependences (relationships in terms of definition and reference) of data between the tasks. Moreover, when a branch is determined, a program which uses the same data can be determined. In this way, based on the information obtained by the compiler, timings in which data stored in the memory is used are determined, and the data can be reused by a plurality of tasks.

In other words, according to this invention, in order to keep data stored in a high-speed memory close to the processor in place for as long a period as possible while processing continues, the data are efficiently arranged. Specifically, necessary data is stored in the high-speed memory close to the processor, and data which is no longer necessary is sequentially transferred to a low-speed but high-capacity memory. Moreover, according to this invention, data is divided, and divided data is assigned to a local memory. Moreover, in order to use the data stored in the local memory for as long a period as possible, based on information (information on when and where the data is used) held by the compiler, determination of which data is to be unloaded is made. Moreover, the DMA is scheduled to load necessary data first.

It should be noted that this invention can be applied to memory management carried out by heterogeneous multi-processors of different types as well as memory management carried out by processors of the same type.

According to this invention, the management of a memory area in a memory becomes easy, assignment of data to the local memories and the distributed shared memories can be optimized. As a result, data loaded on the memory can be reused, and hence transfer of the data between memories is decreased.

BRIEF DESCRIPTION OF THE DRAWINGS

FIGS. 23A and 23B are explanatory diagrams describing the specific example of creation of the code image (status 5) according to the embodiment of this invention.

FIGS. 25A and 25B are explanatory diagrams describing the specific example of creation of the code image (status 7) according to the embodiment of this invention.

FIGS. 27A and 27B are explanatory diagrams describing the specific example of creation of the code image (status 9) according to the embodiment of this invention.

FIGS. 29A and 29B are explanatory diagrams describing the specific example of creation of the code image (status 11) according to the embodiment of this invention.

FIGS. 31A and 31B are explanatory diagrams describing the specific example of creation of the code image (status 13) according to the embodiment of this invention.

FIGS. 32A and 32B are explanatory diagrams describing the specific example of creation of the code image (status 14) according to the embodiment of this invention.

FIGS. 33A and 33B are explanatory diagrams describing the specific example of creation of the code image (status 15) according to the embodiment of this invention.

FIGS. 34A and 34B are explanatory diagrams describing the specific example of creation of the code image (status 16) according to the embodiment of this invention.

BEST MODE FOR CARRYING OUT THE INVENTION

Figure 1:
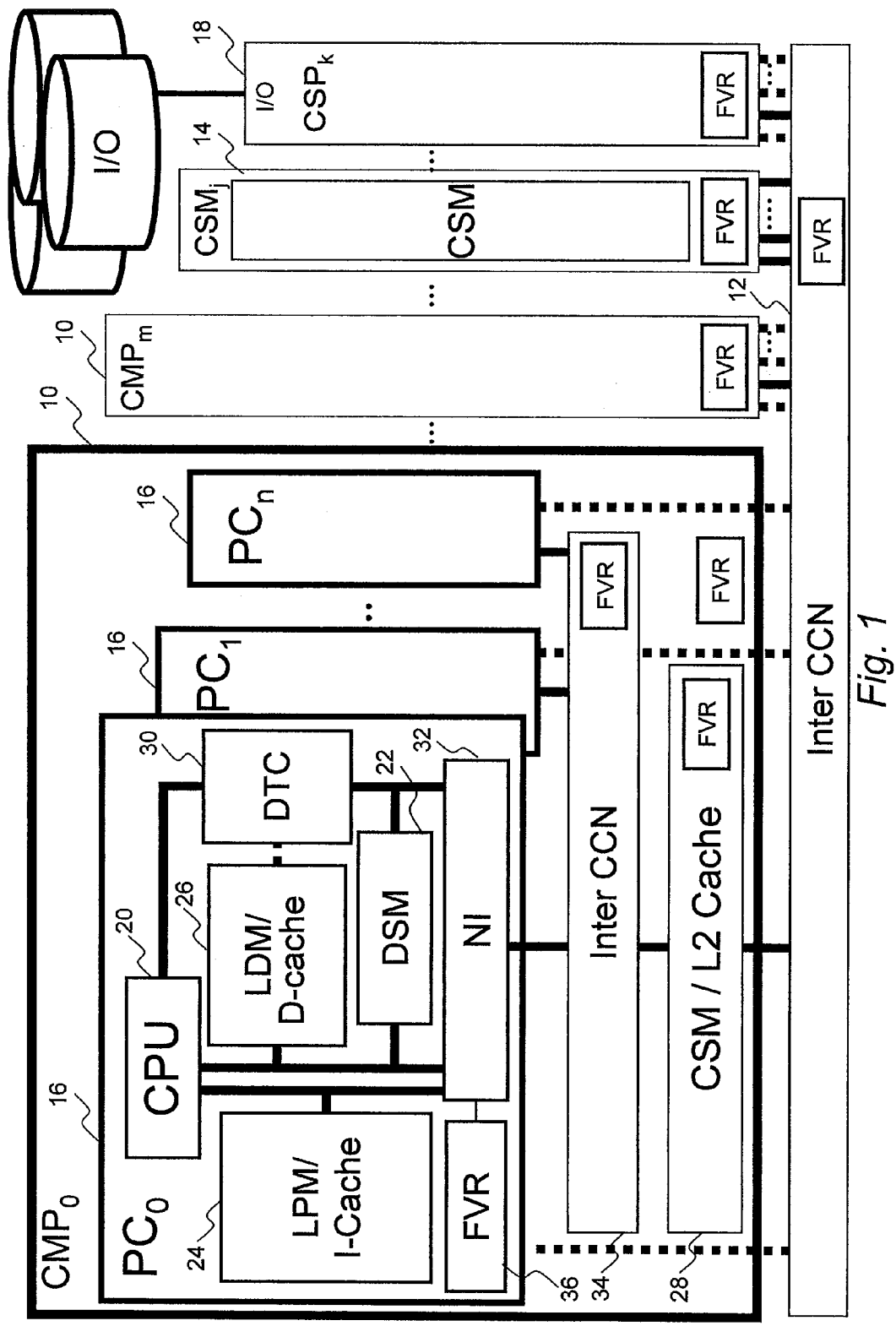
FIG. 1 is a configuration diagram of a single-chip multi-core processor according to an embodiment of this invention.

A description is now given of an overview of this invention.

This invention manages, based on information obtained by analyzing a program by a compiler, a memory area of a memory. The compiler, upon compiling the program, obtains information on the program. Specifically, the compiler can obtain, by the analysis of the program, information on data used by the program, information on a timing in which the data is used next time, and information on processors which use the data. In other words, the timings in which the program uses the data can be obtained. A first feature of this invention is that, based on the information obtained by analyzing the program, assignment of the memory area of the memory is managed.

Specifically, the compiler holds information on an execution schedule of a program (such as processing of respective nested levels), and hence the compiler can obtain information on when data is accessed. Thus, based on the execution schedule of the program, the memory area of the memory can be optimally assigned to the data, and thus, the transfer of the data can be minimized.

Further, the compiler can obtain information on when and which processor needs data assigned to the memory. Thus, without influencing processing by the processor, data can be successively supplied (loaded) to the memory by the DMA controller. Thus, it is not necessary for the processor to stop to wait until the data is loaded on the memory.

Further, the compiler can obtain the information on when data is accessed by a program, and hence the compiler can identify data which is no longer necessary, or is not accessed immediately, and the data which is no longer necessary, or is not used immediately can be unloaded (stored) from the memory area of the memory by the DMA controller. The unloading of data based on information on the future, which is different from the conventionally used least recently used (LRU), does not unload data which has not been used recently but may be used immediately, thereby optimizing the use of the memory, and reducing data transfer between memories.

In other words, a second feature of this invention is that, based on the information obtained by analyzing a program, a timing in which data is transferred to and/or from a memory can be determined.

In this way, in order to manage the memory area of the memory, the memory area of the memory is divided into blocks in fixed sizes, and the data is assigned to respective blocks. The sizes of the blocks according to which the memory area is divided are determined as proper sizes according to characteristics of the program (such as array sizes and array shapes used by the program, and execution patterns of the program) obtained during the compilation. Moreover, the sizes of the blocks preferably have relationships of integral multiples (such as multiples of two).

In other words, a third feature of this invention is that, based on the information obtained by analyzing a program, the memory area of the memory is divided into blocks in proper sizes, and data are assigned to the blocks. It is not possible for hardware or an operating system (OS) to divide the memory area into the blocks in the fixed sizes according to the characteristics of the program. This is because, if the memory area is divided by the hardware or the OS, the memory area is always divided into the blocks in the same size.

Further, according to the type and extent of data to be accessed, the sizes of data used by the program may vary, and thus, in order to accommodate the sizes of data used by the program, blocks in a plurality of sizes are provided. Then, the size of the assigned block is changed so as to meet the size of the data.

Further, as data necessary upon execution of the program (data which should be loaded on the memory at a certain moment is referred to as working set) is decomposed, the program is also decomposed. For example, when a loop is decomposed into two parts, data to be used is also decomposed into two parts. A fourth feature of this invention is that, based on the information obtained by analyzing the program, the number of divisions of the program is determined so as to accommodate a working set in the memory area of the memory. For example, when a program is decomposed, a single large loop is decomposed, and loops in a smaller chunk are executed repeatedly.

Further, for nested loops, usually multi-dimensional array variables are used. When, a multi-dimensional array variable is to be assigned to a block in a fixed size having a one-dimensional address space, a multi-dimensional array template is assigned to the one-dimensional block. The shape and the size of this multi-dimensional array template are determined based on the shape and the size of the array variable used in the program. A fifth feature of this invention is that, based on the information obtained by analyzing the program, a template assigned to the block is determined. As a result, while a trouble of converting indices of an array variable and an increase of complexity of the program are avoided, an arbitrary array can be assigned to an arbitrary address in the memory.

In the embodiment of this invention, a specific description is given of use of data, but definition of data (calculating data, and then storing the data in a memory) as well as memory management for use (reference) of data by processors are included within the scope of this invention. In other words, this invention can be applied to data access including both the use and definition of data.

A description is now given of the embodiment of this invention referring to drawings.

FIG. 1 is a configuration diagram of a single-chip multi-core processor according to the embodiment of this invention.

The single-chip multi-core processor 10 according to the embodiment of this invention includes a plurality of multi-core chips (CMP0, . . . , CMPm) 10 having a plurality of processor cores (PC0, PC1, . . . , PCn) 16, a plurality of centralized shared memories (CSM0, . . . , CSMj) 14, a plurality of input/output chips (I/O CSP0, . . . , I/O CSPj) 18, and an inter-chip connection network (Inter CCN) 12.

The inter-chip connection network 12 is realized by an existing coupling technology (such as a crossbar switch, a bus, and a multi-stage network), and couples the plurality of processor cores 16, the plurality of centralized shared memories 14, and the input/output chips 18. The centralized shared memory 14 is a memory which is shared by all the processor cores 16 in the system, and can be accessible from the respective processor cores 16. The centralized shared memory 14 supplements a centralized shared memory 28 provided in the multi-core chips 10.

The respective multi-core chips 10 include the plurality of processor cores (PC) 16, the centralized shared memory (CSM/L2 Cache) 28, and an intra-chip connection network (Inter CCN) 34. The respective processor cores 16 include a CPU 20, the distributed shared memory (DSM) 22, a local program memory (LPM/I-Cache) 24, a local data memory (LDM/D-cache) 26, a data transfer controller (DTC) 30, a network interface (NI) 32, and a frequency/voltage control register (FVR) 36.

The CPU 20 can be any CPU capable of an integer operation and a floating point operation, and is not specifically limited. For example, a CPU of the single-issue RISC architecture which is simple in architecture of loading/storing data may be used. Moreover, a superscalar processor, a VLIW processor, and the like may be used.

The distributed shared memory (DSM) 22 includes a dual-port memory, and data stored therein can be directly read/or written by another processor core 16 via the data transfer controller 30, and the distributed shared memory (DSM) 22 is used for data transfer between tasks.

The local program memory (LPM) 24, according to an execution sequence of tasks defined by a scheduler, reads ahead and caches an instruction to be executed from another memory. It should be noted that the local program memory 24 can also be used as an ordinary data cache memory, and is used as a cache for reducing a hit miss.

The local data memory (LDM) 26 is a memory accessible only in the each processor core 16, and stores data (such as array variables) used by tasks assigned to the each processor core 16. Moreover, the local data memory 26 can be switched to an L1 data cache.

The data transfer controller (DTC) 30 includes a publicly-known DMA controller, and, according to a timing determined by the scheduler, transfer instructions to be executed and data to be used between the data memories. Specifically, the data transfer controller 30 transfers data among the local memory 26 on the own or another processor core 16, the distributed shared memory 22 on the own and another processor core 16, the centralized shared memory 28 on the own and another multi-core chip 10, and the centralized shared memory 14 provided on another chip.

It should be noted that a broken line between the local data memory 26 and the data transfer controller 30 indicates that, according to an application of the single-chip multi-processor, there may be provided a configuration that the data transfer controller 30 may access the local data memory 26. In this case, the CPU 20 can supply, via the local data memory 26, the data transfer controller 30 with a transfer instruction. Moreover, the CPU 20 can check transferred data after transfer is finished.

The CPU 20 instructs, via the local data memory 26, the distributed shared memory 22, or a dedicated buffer (not shown), the data transfer controller 30 to transfer data. Moreover, the data transfer controller 30 reports, via the local data memory 26, the distributed shared memory 22, or a dedicated buffer (not shown), reports an end of the data transfer to the CPU 20. On this occasion, determination of which memory or buffer is used is made according to an application of the processor when the processor is designed. Alternatively, a plurality of hardware methods may be provided so that, according to characteristics of the program, the compiler or a user can select usage thereof by means of software.

As a data transfer instruction (such as how many bytes of data from which address is stored in or loaded to which location, and a mode of the data transfer (such as continuous data transfer and stride transfer)) directed to the data transfer controller 30, it is preferable that the compiler store data transfer instructions in a memory or a dedicated buffer and issue only an instruction of which data transfer instruction is to be execute during the execution of a program so as to reduce an overhead to drive the data transfer controller 30.

The network interface (NI) 32 is, for enabling communication between the processor cores 16 in the each multi-core chip 10, coupled to the intra-chip connection network 34. The intra-chip connection network 34 is coupled to the inter-chip connection network 12. The processor core 16 can communicate with the processor core 16 in another multi-core chip 10 via the inter-chip connection network 12.

The processor core 16 is coupled to the centralized shared memory 14 via the intra-chip connection network 34. The centralized shared memory 14 is coupled to the inter-chip connection network 12.

It should be noted that the network interface 32 can be directly coupled to the inter-chip connection network 12 without routing thorough the intra-chip connection network 34. Such a configuration enables equal access of all the processor cores 16 in the system to the centralized shared memories 28 distributed and disposed on the respective chips and the distributed shared memory 22. Moreover, by providing directly coupled paths, even when quantity of data transferred between the chips is high, the data transfer capability of the entire system can be increased.

To the frequency/voltage control register (FVR) 36, in order to control an operation frequency and an operation voltage of the processor core 16, a power supply voltage and a clock frequency supplied to the processor cores 16 are set. As illustrated, the frequency/voltage control registers are provided in the multi core chips 10, the inter-chip connection network 12, the centralized shared memory 14, the input/output chip 18, the centralized shared memory 28, and the intra-chip connection network 34 as well as in the processor cores 16, and hold data for controlling operation frequencies and operation voltages of those respective components.

Figure 2:
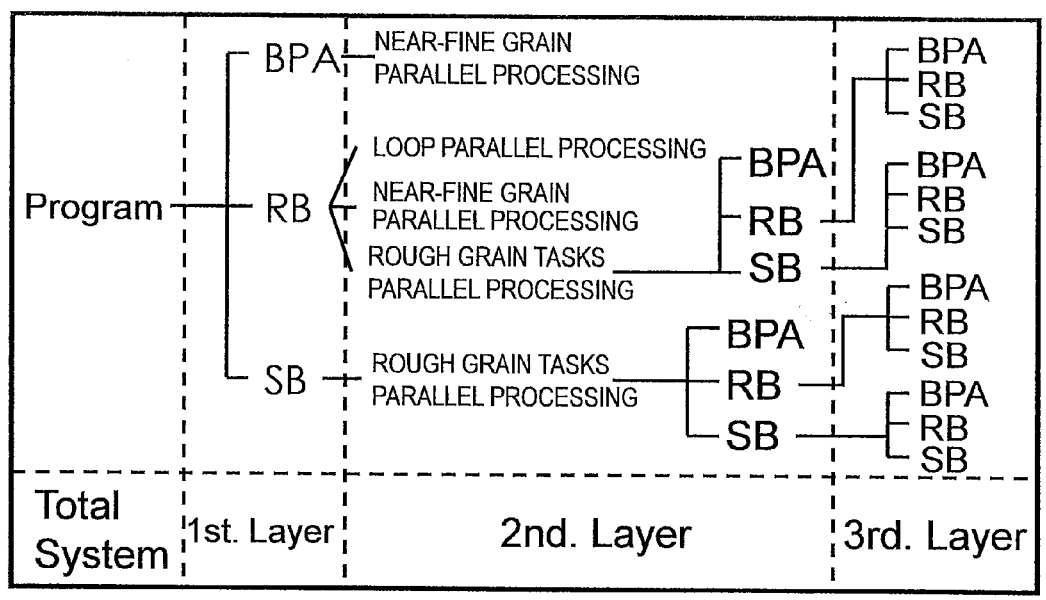
FIG. 2 is an explanatory diagram describing a multi-grain parallel processing according to the embodiment of this invention.

FIG. 2 is a diagram describing multi-grain parallel processing according to the embodiment of this invention.

The multi-grain parallel processing is a type of parallel processing hierarchically using coarse grain parallelism, medium grain parallelism, and near-fine grain parallelism. The coarse grain parallelism is parallelism between subroutines, between loops, and between basic blocks. The medium grain parallelism is parallelism between iterations of a loop. The near-fine grain parallelism is parallelism between statements and between instructions. This multi-grain parallel processing enables global flexible parallel processing covering a plurality of granularities across an entire program, which is different from conventional local and single-grain parallelism (such as parallelism between loops and parallelism of instruction level).

In the multi-grain parallel processing, the parallel processing is carried out according to the following steps.
1) Create macro tasks from a source program.
2) Create a macro flow graph by analyzing control flows and data dependencies between macro tasks.
3) Create a macro task graph by means of the earliest executable condition analysis.

A specific description is now given of those steps.

In the multi-grain parallel processing using the parallelism between subroutines, loops, and basic blocks in a single program, a Fortran program, for example, which is a source, is decomposed as coarse grain tasks (macro tasks) into macro tasks (MTs) of three types: repetition block (RB), subroutine block (SB), and block of pseudo assignment statements (BPA). The repetition block is the outer-most loop of the respective hierarchies.

Moreover the block of pseudo assignment statements is a basic block combined and/or divided considering scheduling overhead and parallelism. On this occasion, though the pseudo assignment statement block is basically an ordinary basic block, in order to extract parallelism, a single basic block may be divided into a plurality of parts. Moreover, when a processing time of a single pseudo assignment statement block is short, and an overhead upon dynamic scheduling is not negligible, a plurality of pseudo assignment statement blocks are combined so as to create a single pseudo assignment statement block.

When a repetition block which is the outermost loop is a Doall loop, by decomposing a loop index, the Doall loop is decomposed into a plurality of partial Doall loops, and the decomposed Doall loops are newly defined as repetition blocks. When a repetition block is a non-Doall loop, hierarchical macro data flow processing is preferably applied to parallelism in the repetition block.

The subroutine block is preferably inlined as much as possible. However, a subroutine which cannot be efficiently inlined when the code length is considered, the subroutine is simply set to a subroutine block. In this case, to parallelism in the subroutine, the hierarchical macro data flow processing is preferably applied.

Figure 3:
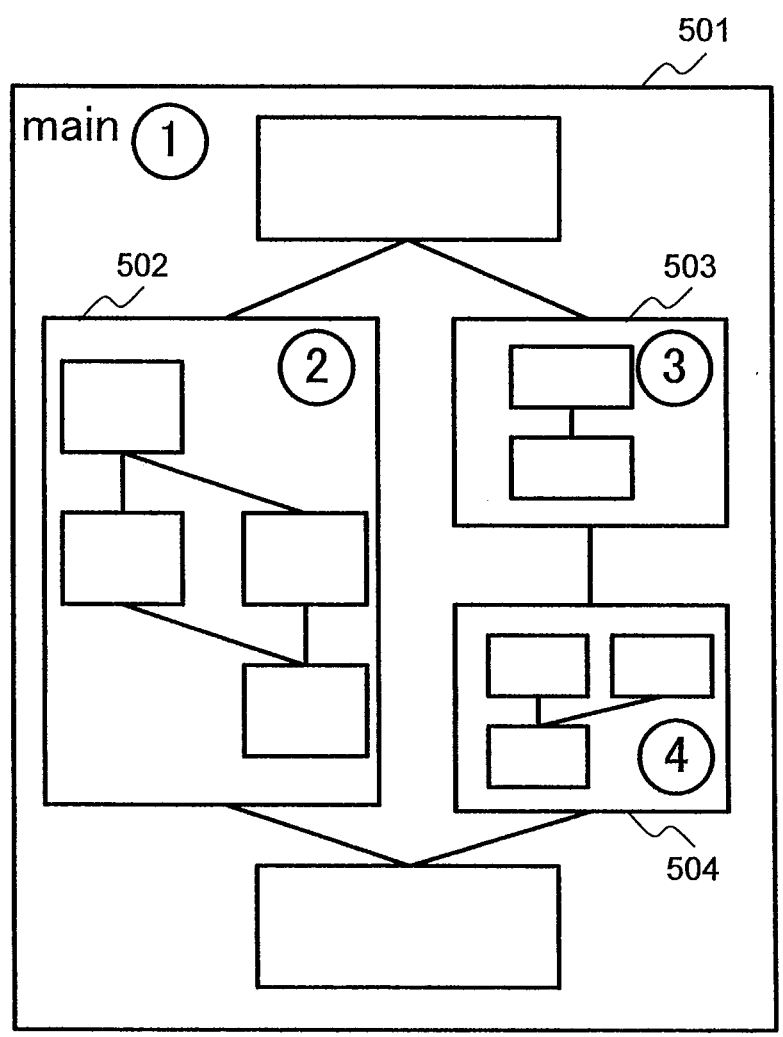
FIG. 3 is an explanatory diagram describing a macro flow graph according to the embodiment of this invention.

Then, by analyzing control flows and data dependencies between the macro tasks, a macro task graph (MTG) as illustrated in FIG. 3 is created. The macro flow graph represents a control flow between macro tasks (MTs). When the macro task graph is created, control dependencies and data dependencies between the macro tasks are simultaneously analyzed, and parallelism between the macro tasks is detected in a form of a condition for executing each task earliest (earliest executable condition). Moreover, a macro task graph represents this earliest execution start conditions as a graph.

Then, the compiler assigns the macro tasks on the macro task graph to processor clusters (groups of processors defined by the compiler or a user). This assignment of tasks includes a static scheduling which is assignment upon compilation, and dynamic scheduling which is assignment during execution. The dynamic scheduling creates a dynamic scheduling code by using a dynamic CP algorithm, and embeds the created dynamic scheduling code into a program. In the dynamic scheduling, until the execution, which macro task is executed on which processor is not known, and hence data shared among macro tasks are preferably assigned to the centralized shared memory 14 which appears to be equidistance from all the processors.

In the multi-grain parallel processing, a loop block assigned to a processor cluster by the macro data flow processing, when the loop block is a Doall loop or a Doacross loop, is decomposed on the iteration level, and loops are parallelized so that the loop block is processed by a plurality of processor cores 16 in a processor cluster.

To the loop restructuring, conventional technologies such as the change of execution sequence of statements, the loop distribution, the node splitting scalar expansion, the loop interchange, the loop unrolling, the strip mining, the array privatization, and the unimodular transformation (such as loop reversal, permutation, and skewing) can be directly applied.

Moreover, for a loop to which the loop parallelizing processing cannot be applied, near-fine grain parallel processing, or coarse grain task parallel processing which hierarchically decomposes a body of a loop into macro tasks is applied.

When a macro task assigned to a processor cluster is a block of pseudo assignment statements or a loop block to which the loop parallelizing or the hierarchical macro data flow processing cannot be applied, statements or instructions in the block of pseudo assignment statements are considered as near-fine grain tasks, and are processed in parallel by the processors in the processor block.

The near-fine grain parallel processing in a multiprocessor system, by scheduling near-fine grain tasks so that loads among processors are balanced and data transfer between processors are minimized, efficient parallel processing is realized. Further, in the scheduling required in this near-fine grain parallel processing, there is restrictions on an execution sequence due to data dependency among the near-fine grain tasks, and hence the execution sequence of the tasks poses a problem.

A near-fine grain task graph generated in this way is statically scheduled for the respective processors. On this occasion, as the scheduling algorithm, a publicly known heuristic algorithm for minimizing a execution time considering a data transfer overhead (CP/DT/MISF, CP/ETF/MISF, ETF/CP, or DT/CP) is applied thereby determining an optimal schedule.

After the scheduling, the compiler, by sequentially arranging an instruction sequence of tasks assigned to a processor core, and inserting data transfer instructions and synchronization instructions to necessary locations, creates machine codes for respective processors. On this occasion, the inserted data transfer instruction can determine a timing to store data to the local memory 26 or to unload data from the local memory 26 according to control dependency and data dependency between macro tasks.

The "version number" method is preferably used for synchronization between near-fine grain tasks, and a synchronization flag is received by a processor core on a receiver side in busy waiting. On this occasion, the data transfer instruction and the synchronization flag can be set with a low overhead by direct writing to the distributed shared memory 22 on the processor core 16 on the receiver side by the processor on the sender side.

<Local Memory Management>

Figure 4:
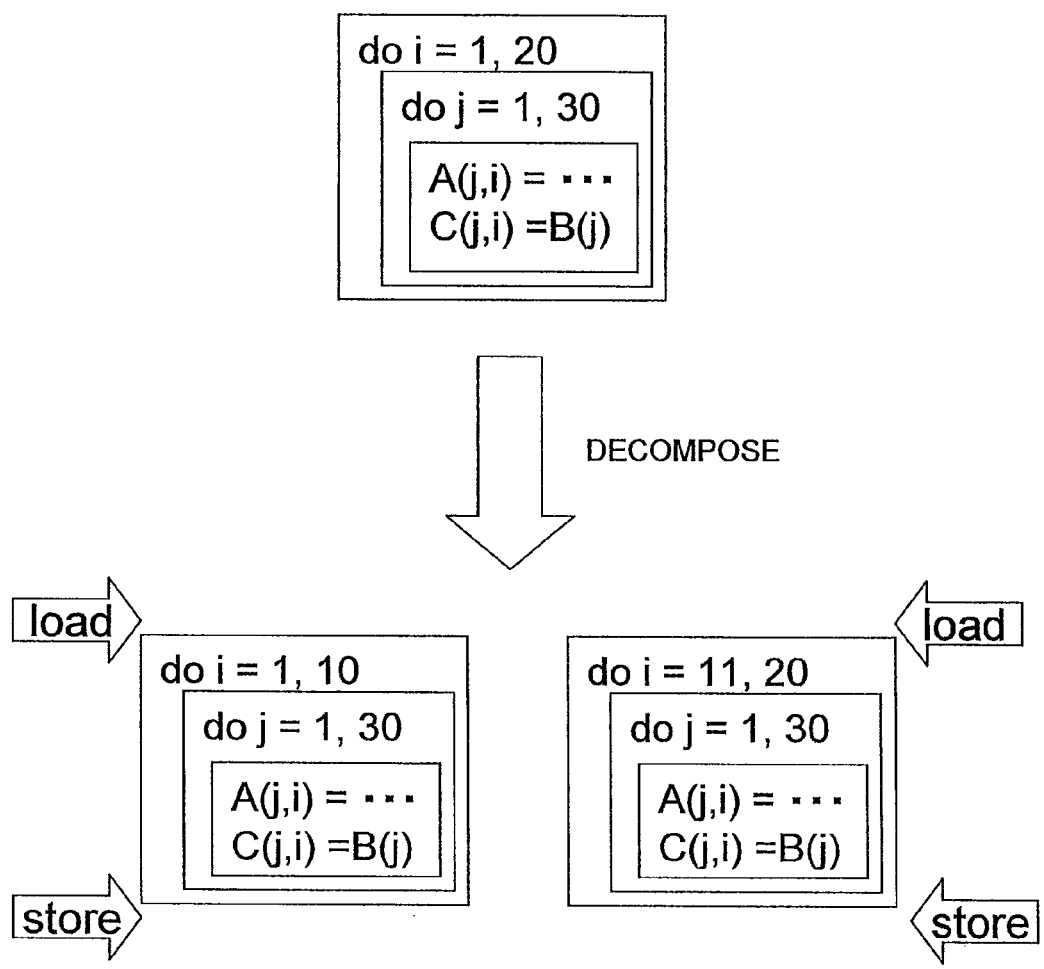
FIG. 4 is an explanatory diagram describing an overview of local memory management according to the embodiment of this invention.

FIG. 4 is a diagram describing an overview of local memory management according to the embodiment of this invention.

A program is generally decomposed into a plurality of hierarchies according to subroutines and nested loops. Thus, it is important to consider in which timing data necessary for execution of the program is to be transferred. For example, for a loop, data is preferably transferred before and after the loop. Specifically, data is transferred to a local memory before the execution of the loop, and data is transferred from the local memory after the execution of the loop. Then, in the loop, the data is preferably arranged so that the loop can be executed while the data is loaded on the local memory. A unit of a program which can be executed while data is being loaded on a local memory is referred to as local memory management macro task.

In other words, data handled by the local memory management task is data in a size which can be surely loaded on the local memory. Moreover, the data necessary for the execution of the local memory management macro task is transferred (loaded and stored) in a proper timing before or after the execution of the local memory management macro task. Further, the local memory management macro task is determined so that transfer of data does not occur inside the task.

Then, for a loop for which all necessary data cannot be loaded on the local memory, portions of the loop for which all data to be used can be loaded on the local memory are defined as the local memory management macro tasks. In other words, the program is decomposed so that all the necessary data can be loaded on the local memory, and, thus, the local memory management macro tasks are determined. In this way, the local memory management macro task is determined, and data necessary for the execution of the local memory management macro task is transferred (loaded to the local memory, and stored from the local memory to the centralized shared memory) before and after the execution of the macro task. As a result, in the macro task, transfer of data does not occur.

The description has been given of the loop, and the same holds for a basic block and a subroutine in a program. It should be noted that there is an exception for the subroutine, which is described later.

Moreover, though a description is here given of the management of the local memory, this invention can be applied to a memory as long as the capacity of which is restricted (the storage capacity is smaller than data to be used). For example, in addition to the local memory 26, this invention can be applied to the distributed shared memory 22 in the processor core 16, the on-chip centralized shared memory 28, and the off-chip centralized shared memory 14.

A description is now given of the method of creating local memory management macro tasks by decomposing the program described above referring to FIG. 4.

It is assumed that 1000 of elements of an array variable can be loaded on the local memory. Moreover, as illustrated in FIG. 4, this program contains two nested loops controlled by variables i and j. In the loops, in an array variable A[1:30,1:20], 600 elements are to be used, in an array variable B[1:30], 30 elements are to be used, and in an array variable C[1:30, 1:20], 600 elements are to be used. In total, in the loops, 1230 of the array elements are to be used. Thus, it is not possible to load all the data on the local memory, thereby executing the loops.

Then, a compiler according to the embodiment of this invention decomposes the loop controlled by the variable i into two loops for i=1 to 10, and i=11 to 20. Then, the data accessed in the respective loops comes to include 630 elements, and hence the loops can be executed from the beginning to the end while the entire data is loaded on the local memory. Those decomposed loops are local memory management macro tasks. Then, before and after the execution of the macro tasks, necessary data is loaded and stored.

The transfer (load) of the data to the local memory may not be carried out immediately before the execution of the macro task, but considering assignment of other data to the block, may be carried out long before. In an arbitrary timing before the execution of a macro task in which array variables (data) are used starts, loading the array variables used in the macro task on the memory in this way is referred to as "preload". This preload may be carried out by transfer of data by means of DMA even when another macro task is being executed, as long as a block to which the data is to be loaded has a free space. In this way, according to the vacancy of a block, even before a macro task is executed, data can be loaded, thereby preparing necessary data before the execution of a program. As a result, it is possible to reduce a wait time of the processor due to a case in which necessary data is not loaded on the memory.

Moreover, the transfer (store) of the data from the local memory may not be carried out immediately after the execution of the macro task, but considering assignment of other data to the block, may be carried out long after. In an arbitrary timing after the execution of a macro task in which array variables (data) are used finishes, loading the array variables having been used in the macro task on the memory in this way is referred to as "poststore". This poststore may be carried out by transfer of data by means of DMA from the local memory to the centralized shared memory even when another macro task is being executed. In this way, by storing data in an arbitrary timing in this way, it is possible to avoid a load imposed on the DMA from concentrating before and after the execution of a macro task.

Next, a description is given of the exception in a subroutine as described before.

As described before, data transfer does not generally occur in the local memory management macro task. However, in two cases in which a subroutine is set as a local memory management macro task, and a loop calling a subroutine is set as a local memory management macro task, it is necessary to transfer (load and/or store) data in a subroutine.

Specifically, when the subroutine starts, array variables used by a calling source of the subroutine are loaded. For example, when save, common, and data variable in Fortran, and a static variable and a global variable in C language are used, those variables cannot be managed by the calling source. Thus, it is necessary to transfer, after the processing of a subroutine in a macro task is finished, used variables to the shared memory. This is because, unless the variables are read out from the local memory and are written to the shared memory when the subroutine is finished, the data cannot be consistent. It should be noted that a macro task is executed by a single physical processor, and hence even if data is loaded and stored in the macro task, a correct value is guaranteed.

<Division of Memory Area>

Figure 5:
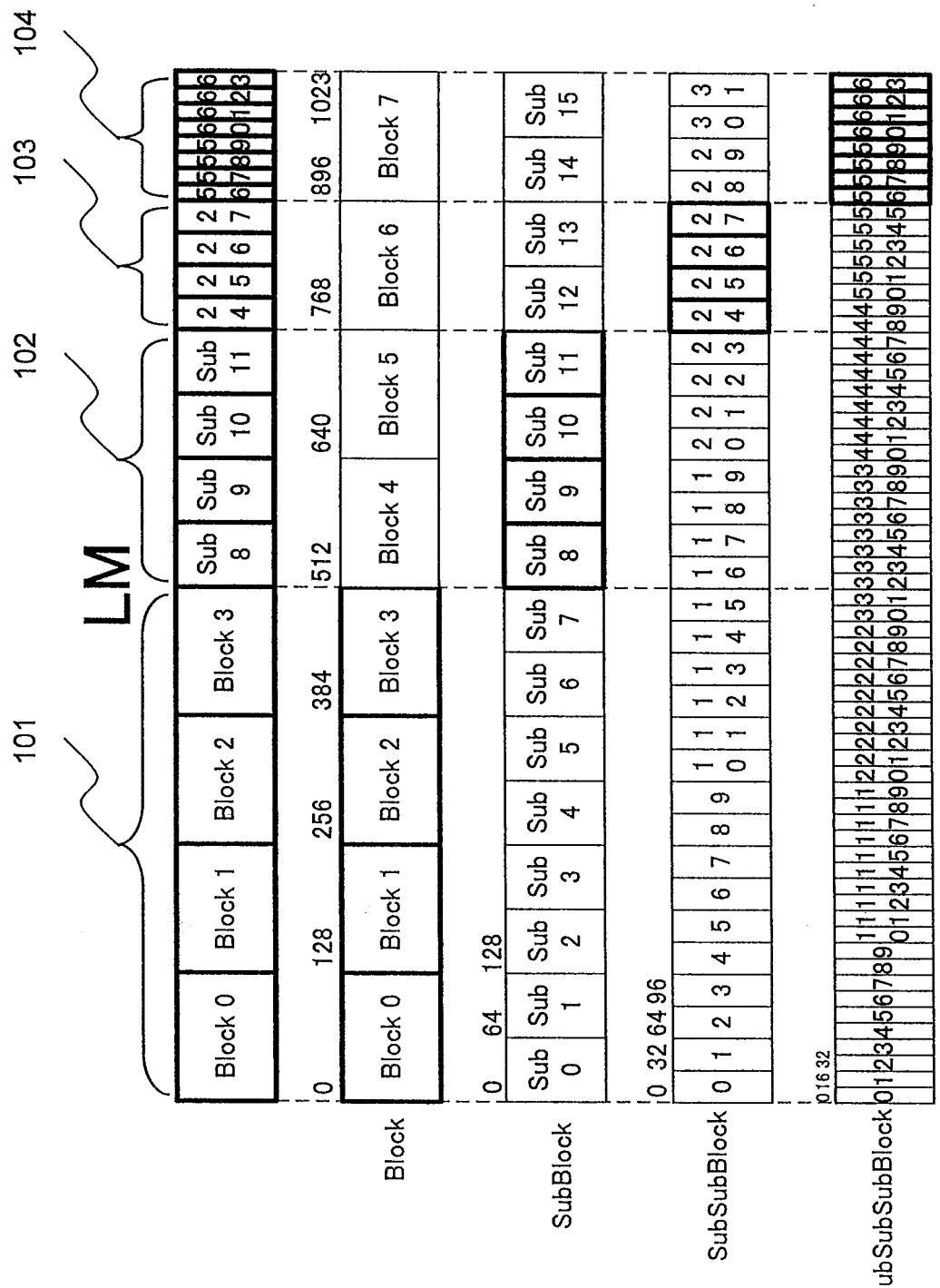
FIG. 5 is an explanatory diagram describing a status of division of a memory area of a memory according to the embodiment of this invention.

FIG. 5 is a diagram describing a status of division of a memory area of a memory according to the embodiment of this invention.

Memories subject to the memory area management according to this invention include the local memory and the distributed shared memories. A memory area of those memories to be managed is divided into a plurality of blocks (including subblocks) 101 to 104.

FIG. 5 illustrates blocks obtained by dividing the memory area of the local memory. Blocks 101 are areas in a fixed size obtained by dividing the memory area of the local memory by powers of 2 (one eighth in the illustrated example). Moreover, the blocks 4 to 7 are divided into subblocks 8 to 15 (102) which are halves of the block size. Further, the subblocks 12 to 15 are divided into subsubblocks 24 to 31 (103) which are halves of the subblock size. Further, the subsubblocks 28 to 31 are divided into subsubsubblocks 56 to 63 (104) which are halves of the subsubblock size.

The blocks 101, the subblocks 102, the subsubblocks 103, and the subsubsubblocks 104 are independently managed. The compiler can set a block in an arbitrary size to respective address spaces of the memory. The compiler sets blocks and the like in proper sizes according to a program to be compiled. In other words, by preparing blocks in large sizes for a program handling large data, and preparing blocks in small sizes for a program handling small data, the local memory can be efficiently used without a loss.

It should be noted that, for the sake of easy management of the blocks, to the subblocks and the like, serial numbers are assigned starting from the top address of the memory area. As a result, an area represented by one address is contained in a plurality of blocks and subblocks. For example, the block 0, the subblocks 0 to 1, the subsubblocks 0 to 3, and the subsubsubblocks 0 to 7 represent the same memory space (addresses 0 to 127). In this way, by setting blocks of a plurality of types to the same address in the memory space, the memory can be managed so as to use a block and the like of a proper type.

According to the setting in this way, the size of the subblock is a half of the size of the block, the size of the subsubblock is one fourth of the block, and the size of the subsubsubblock is one eighth of the block. In other words, the memory area of the memory is divided into blocks in a plurality of sizes which are in the relationship of powers of 2 (neighboring sizes of the blocks are in a relationship of twice), and the divided blocks in the plurality of sizes are provided as the memory area.

It should be noted that the block sizes are determined based on the information on a program obtained when the compiler compiles the program, and are thus not changed from the start to the end of the execution of the program. However, when the compiler compiles another program, in order to meet characteristics of the program to be compiled, the number and the sizes of the blocks change. In other words, the block which is a unit of management of the memory area of the local memory in this invention does not have an absolutely fixed size, but has a block size which is determined by the compiler so as to be optimal for data size used by a program based on the information obtained by analyzing the program. Though the block sizes are fixed within a program, optimal block sizes are selected for respective programs.

It should be noted that a block size may be changed while a program is running. Specifically, large array data is used up to a certain step of the program, but when small scalar data (one-dimensional variable) is used subsequently to the step, the block upon the end of the use of the array data may be divided into subblocks. Moreover, by changing assignment of a template, the size of an array variable which can be loaded on a block can be changed. The assignment of a template to a block is described later.

According to this invention, the block size is determined so that all data used by one local memory management macro task are store in one block. In other words, according to the size of the block, the size of the local memory management macro task is determined. Timings in which data is input to/output from a block of a fixed size are determined later by a scheduler based on execution timings of the macro task.

In this way, by dividing the memory area of the local memory into blocks in a plurality of sizes, necessary data used in a local memory management macro task is loaded on a block in an optimal size for the data. Moreover, by managing the memory area of the local memory based on areas in fixed sizes, it is possible to avoid the problem of the fragmentation which occurs in a case of management based on areas in variable sizes.

In the example of the decomposed loop illustrated in FIG. 4, the array variable A can be accommodated in one block of the local memory. Moreover, the array variable B is accommodated in one subblock. In other words, the size of a block is determined by the compiler according to properties of a program. More specifically, in order to accommodate the array variable A into one block of the local memory, the block size is determined, and the loop is decomposed. Then, usually, the block size is not changed from the beginning to the end of a program to be compiled.

<Loading and Storing Data>

Next, a description is given of writing (loading) and reading (storing) of data to and from a block, and assignment of a block.

As illustrated in FIG. 5, to the memory the memory area of which are divided, data used by a local memory management macro task is loaded. First, the scheduler determines whether a memory on which the data is to be loaded is the local memory or the distributed shared memory. On this occasion, data shared by a plurality of processor cores may be loaded on the distributed shared memory.

Then, the scheduler, when there is a block to which necessary data has already been loaded, simply uses the data loaded on the block. On the other hand, when necessary data is not loaded on any blocks, the scheduler assigns a free block to the data to be loaded, and loads the necessary data to the assigned block. Further, when there is no free block, data with the highest unloading priority is read from the local memory 26, and is written to the centralized shared memory 28 or 14, and the necessary data is loaded to the memory area which has become a free block.

Figure 6:
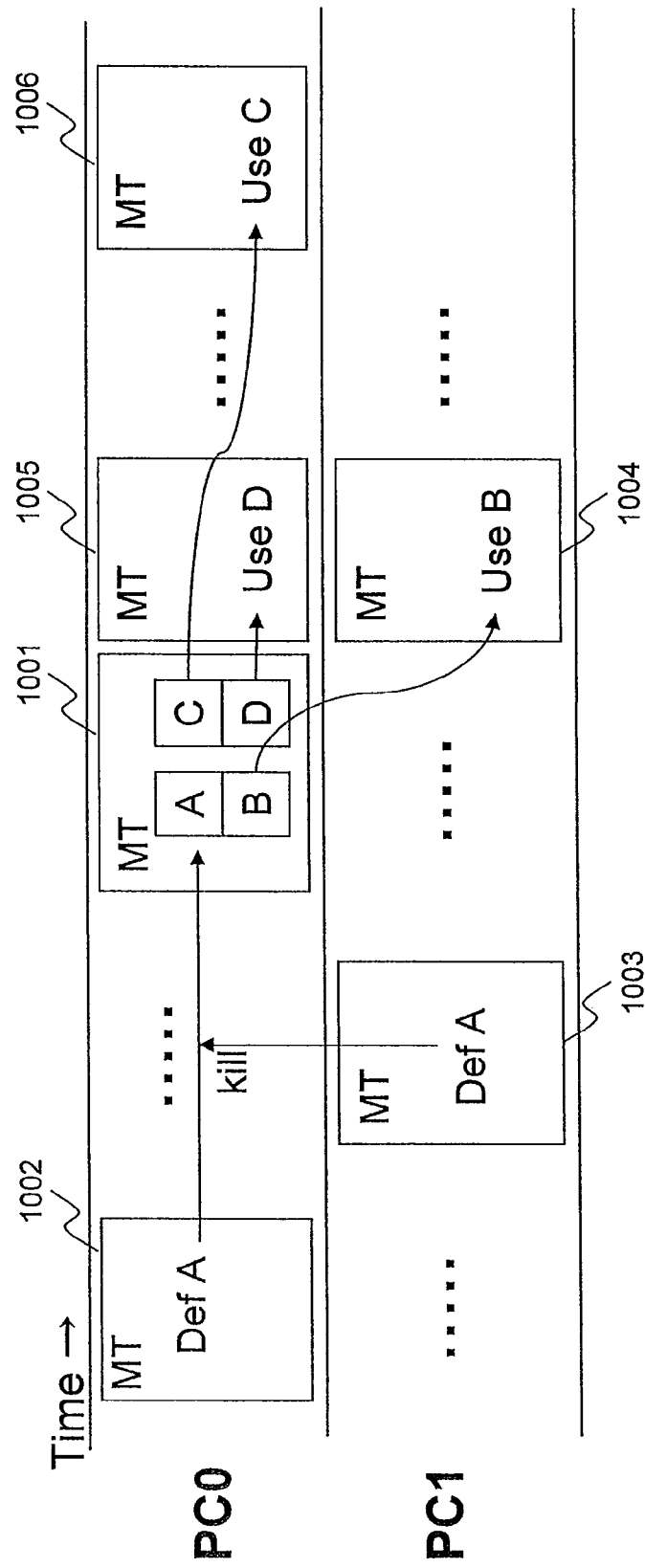
FIG. 6 is an explanatory diagram describing unloading priority of the memory according to the embodiment of this invention.

FIG. 6 is a diagram describing the unloading priority of the memory according to the embodiment of this invention, and the horizontal axis represents passage of time.

According to the embodiment of this invention, the unloading priority is determined in the following order.

1) Data which will no longer be accessed.
2) Data accessed by other processor, but not accessed by own processor.
3) Data used again by the own processor, but used in the future.
4) Data immediately used by the own processor.

Data which will no longer be accessed subsequently is a variable which has been calculated again, for example. Such a variable that is already dead does not need to be kept left, and thus has the highest unloading priority. Data which is to be accessed by other processors, but not by the own processor may be transferred to the distributed shared memory 22 of the processor core 16 which needs the data, and, thus, has the next highest unloading priority. Though data to be accessed by other processors may be immediately transferred to the distributed shared memory 22, when the data cannot be transferred immediately due to a status of the memory of the other processor core 16, the data may be transferred to the distributed shared memory 22, or may be transferred to the centralized shared memory 28 or 14 slightly later. In order to permit freedom for the transfer timing of data from the local memory 26 in this way, the unloading priority is set lower than that of the data which is accessed no longer.

Finally, for data which is accessed again by the own processor, the priority is determined according to a period until the next use. When the time of use of the data is in the far future, the unloading priority is set to high, and when the time of use is in the immediately near future, the unloading priority set to the data is low, thereby keeping the data loaded on the memory for as long a period as possible.

Referring to FIG. 6, a description is now given of the unloading priority of a memory as time elapses. In FIG. 6, a status in which, in a local memory management macro task presently running on a processor core 0 (PC0), array variables A, B, C, and D are loaded on the local memory is to be considered (1001).

In this local memory management macro task, first, the array variable A is defined (Def A) in the processor core 0 (PC0), and the array variable A is used (1002).

Then, in the processor core 1 (PC1), another array variable A is defined (1003). Then, the array variable A loaded to the local memory of the PC0 has already been changed, and hence the array variable A will no longer be accessed. Thus, the unloading priority thereof is highest. As the coherence control for the cache, data which cannot be consistent can be determined as unnecessary data.

Then, a macro task to be executed later is considered. An array variable B is used by the other processor (PC1) (1004). The array variables C and D are used by the own processor (PC0) (1005, 1006). Thus, the unloading priority of the array variable B is higher than the unloading priorities of the array variables C and D.

As a result of comparison between the array variable C and the array variable D, the array variable D is used earlier than the array variable C. Thus, the unloading priority of the array variable C is higher than the unloading priority of the array variable D. It should be noted that because the array variables C and D are used later, they may be once written back to the centralized shared memory CSM, and may then be loaded when necessity arises.

Thus, the order of the unloading priorities is represented as A, B, C, and D.

Figure 7:
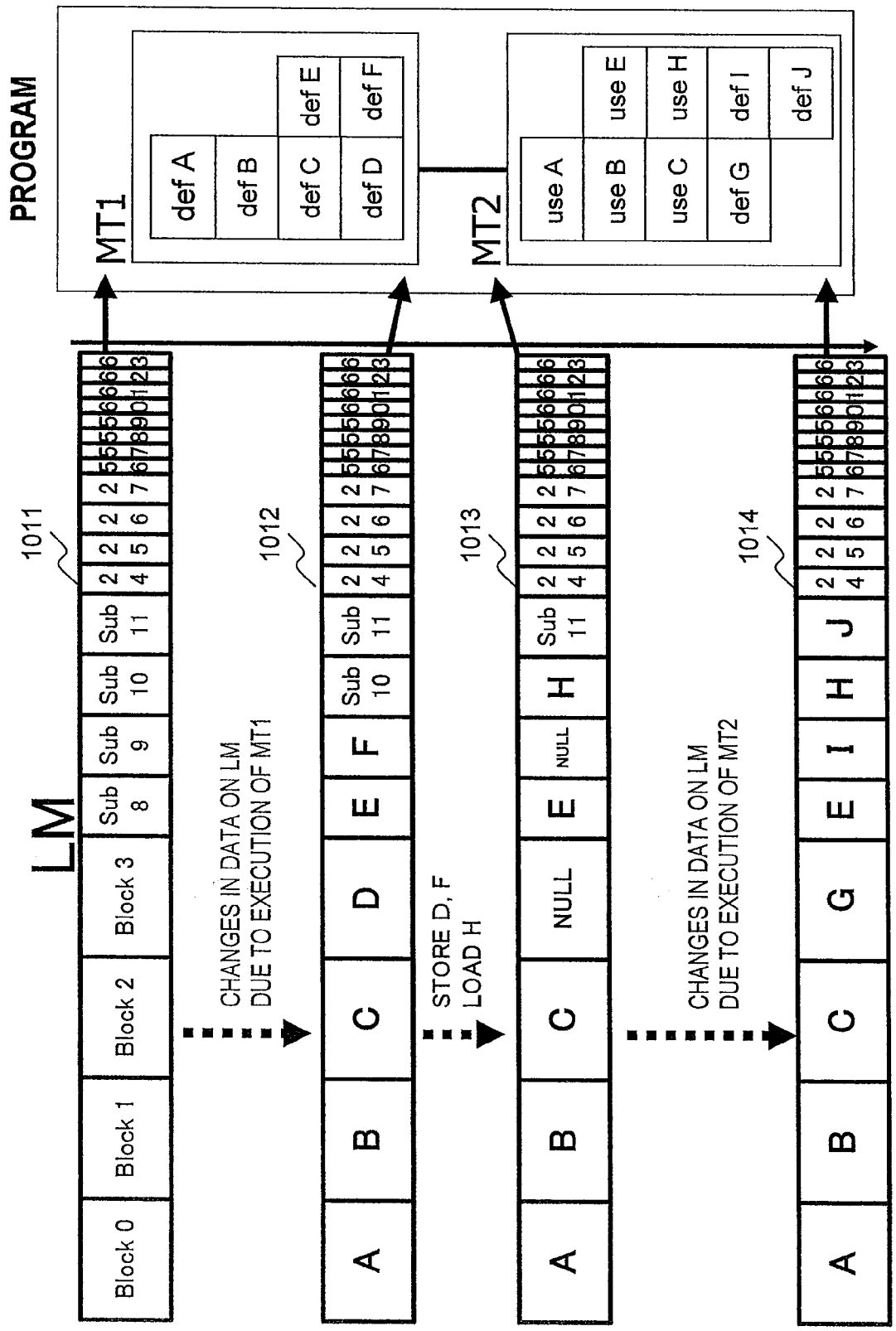
FIG. 7 is an explanatory diagram describing variables loaded on the memory according to the embodiment of this invention.

FIG. 7 is a diagram describing variables loaded on the memory according to the embodiment of this invention.

FIG. 7 illustrates, when, on one processor core, a program containing two local memory management tasks (MT1, MT2) is executed on one layer, a status of the memory before the execution of the program starts, a status of the memory when the execution of the macro task 1 (MT1) has finished, a status of the memory when the execution of the macro task 2 (MT2) starts, and a status of the memory when the execution of the macro task has finished. It should be noted that the memory area of the local memory is divided as illustrated in FIG. 5.

Before the execution of the macro task 1 (MT1) starts, the entire memory area (blocks) of the memory is free (1011). Then, when the macro task 1 starts, blocks are assigned to data (array variables A, B, C, D, E, and F) necessary for the macro task 1, and the respective array variables are loaded on the memory. Then, processing of the macro task 1 starts.

Specifically, by a declaration statement def A, the array variable A is assigned to a block 0. Similarly, the array variable B is assigned to a block 1, the array variable C is assigned to a block 2, the array variable D is assigned to a block 3, the array variable E is assigned to a block 8, and the array variable F is assigned to a block 9.

When the execution of the macro task 1 has been finished, the respective array variables are loaded on the blocks (1012).

When the execution of the macro task 2 (MT2) starts, all data used by the macro task 2 need to have been loaded on the memory. In the macro task 2, array variables, A, B, C, G, E, H, I, and J are used, and, thus, four blocks and four subblocks are necessary. Out of the necessary array variables, the array variables A, B, C, and E have been already loaded on the local memory, array variables to be newly loaded when the macro task 2 is executed are the array variables G, H, I, and J. Out of them, the array variable H has been preloaded on a subblock 10 before the execution of the macro task 2 starts. Moreover, a subblock 11 is free. Thus, when the execution of the macro task 2 starts, one block and one subblock should have been freed.

Then, in order to secure blocks on which the necessary data are to be loaded, according to the unloading priority, the array variable D is unloaded from the block 3, and the array variable F is unloaded from the subblock 9. As a result, the one free block and one free subblock are secured (1014).

As a result, after the execution of the macro task 1, and before the execution of the macro task 2, it is necessary to transfer the array variables D and F to the centralized shared memory, and to transfer the array variable H to the local memory (1013).

Before the execution of the macro task 2 starts, the array variable G is assigned to the block 3, the array variable I is assigned to the subblock 9, and the array variable J is assigned to the subblock 11. Then, the macro task 2 is executed, and the array variables G, I, and J are used by the macro task 2 (1014).

In this way, according to the priority described before, data is stored from the memory to the distributed shared memory, or the centralized shared memory, and hence the use of the memory is optimized, and data transfer between memories is reduced, which are different from the conventional LRU. In other words, according to the conventional LRU, data which has not been used recently but is possibly used soon is also transferred from the memory. However, as this invention, based on the information obtained by the compiler, a timing in which data is used next time is known, and hence the memory can be optimally used.

<Division of Loops>

Next, referring to FIGS. 8 to 11, a description is given of a specific example of division steps of loops.

The loop division is carried out by means of aligned division by considering a plurality of loops. The broadest range of access in the nested loops is analyzed as a global index range. In other words, there are a range in which only access to the local memory is necessary, and a range in which communication with a neighborhood processor is necessary, and, thus, the access ranges of data are analyzed and the ranges are distinguished. Therefore, the structure of a program is analyzed, thereby selecting target loop groups (TLGs). According to this embodiment, different from analysis by a conventional compiler for continuous execution of parallel loops, across a plurality of loops, how the memory is accessed is analyzed.

On this occasion, a status in which two loops are aligned implies a status which satisfies all the following conditions.

1) Each loop is any one of a Doall loop, a Reduction loop, and a Sequential loop due to loop-carried data dependency (recurrence).
2) Data dependence of an array variable is present between loops.
3) A loop control variable of each loop is used in an index equation for the same dimension of the same array, and the array index of the dimension is represented in a first-order equation of the loop control variable.
4) For the respective arrays introducing data dependency between loops, a ratio of control variable coefficients in the index of the array between loops is constant.

On this occasion, all single loops which are not selected are set to target loop groups, nested target loop groups are permitted, and a loop including an indirect reference is selected. In other words, when a loop is present inside a loop selected as a target loop group, a target loop group is also created for the inner loop. Moreover, a loop which cannot be aligned to another loop, this loop by itself forms a target loop group.

A target loop group is a set of repetition blocks (RBs) on a macro task to which the loop aligned decomposition can be applied, and a set of repetition blocks having direct data dependence preceding/succeeding relationships on a macro task graph. This is because a repetition block which has a high cost in execution (consumption of resources such as a memory, a processor and the like) and repetition blocks which are in direct data dependence preceding/succeeding relationships with the repetition block handle a large data, and thus the division is highly efficient for them. As a result, when the same data are used among loops, the same area can be reused thereby preventing the cache miss.

Figure 8:
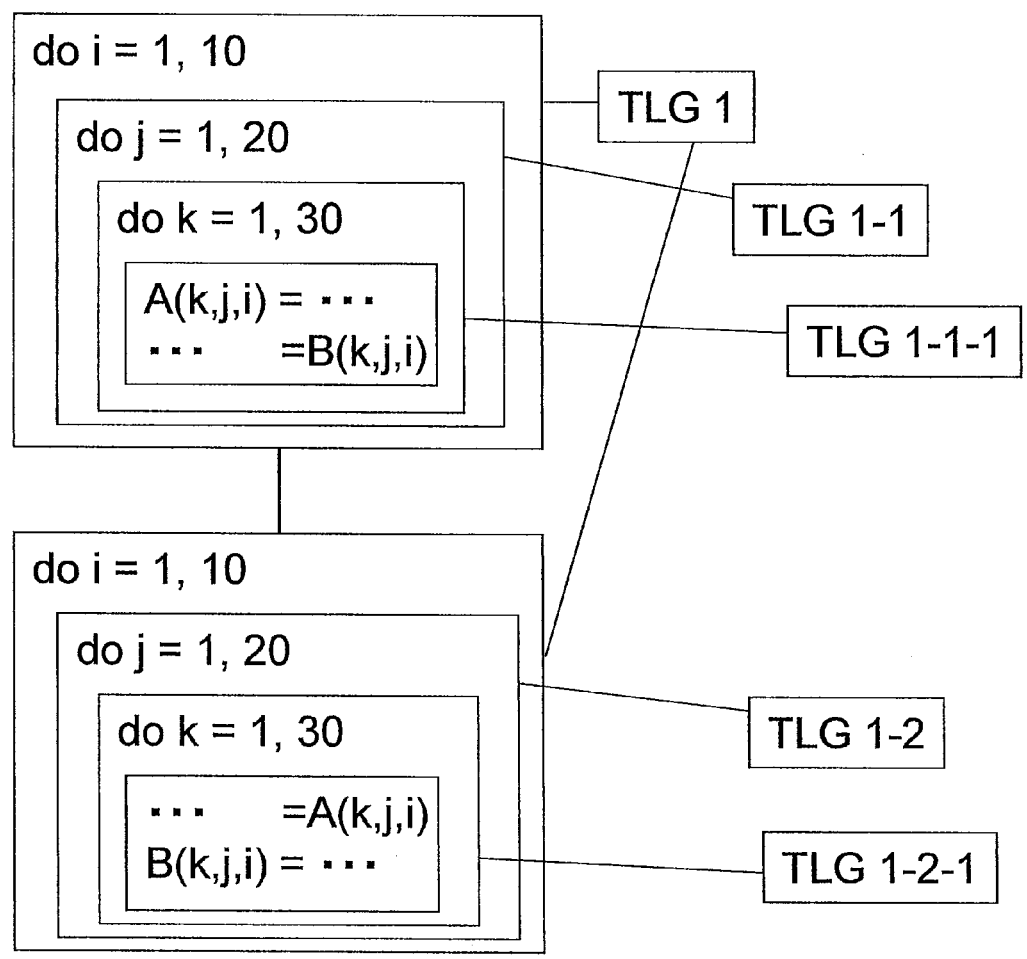
FIG. 8 is an explanatory diagram describing a specific example of division steps of loops according to the embodiment of this invention.

Specifically, in a program illustrated in FIG. 8, two loops controlled by a variable i form TLG1, and the respective loops controlled by a variable j in TLG1 form TLG1-1 and TLG1-2. Further, a loop controlled by a variable k in TLG1-1 forms TLG1-1-1, and a loop controlled by the variable k in TLG1-2 forms TLG1-2-1.

Figure 9:
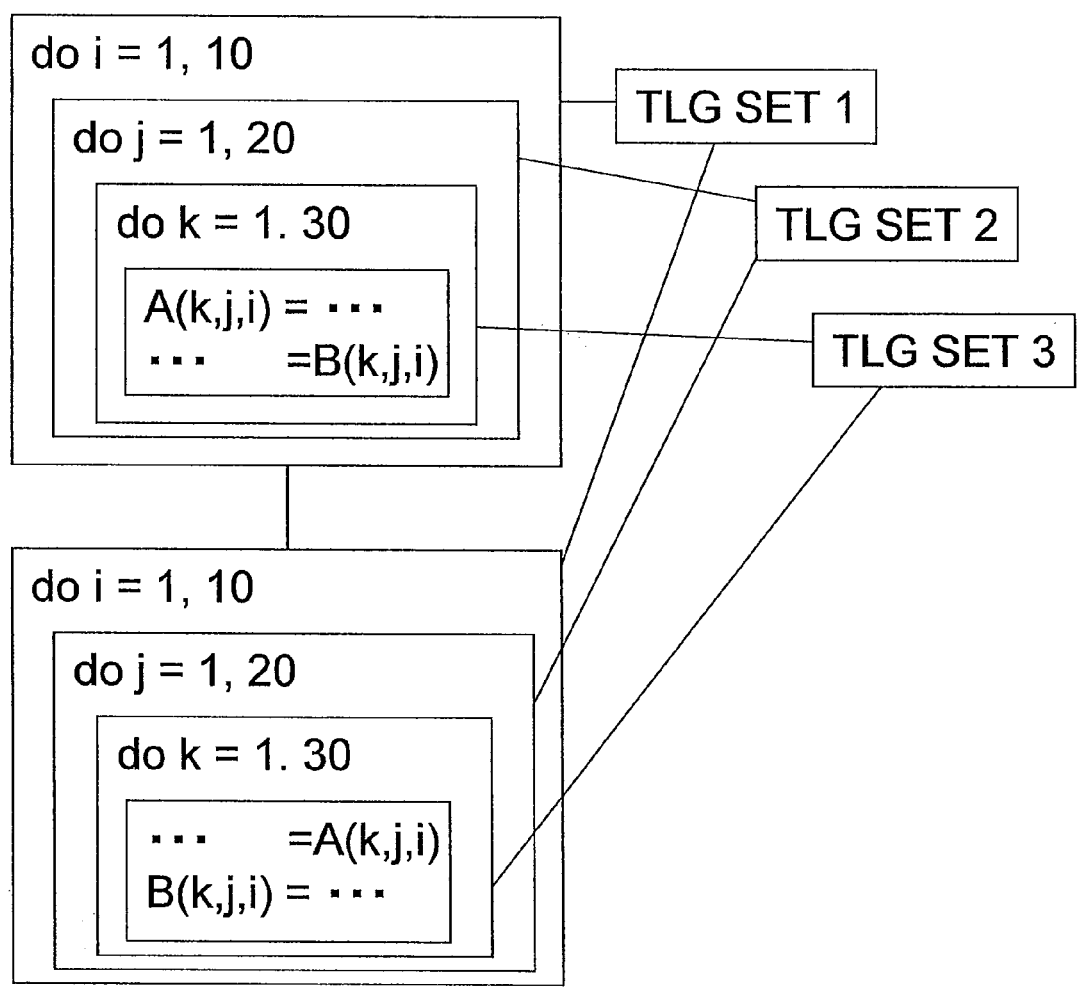
FIG. 9 is an explanatory diagram describing the specific example of division steps of loops according to the embodiment of this invention.

Then, as illustrated in FIG. 9, TLG sets are created. When a TLG satisfies all the following creation conditions, a TLG set is to be generated.
1) TLGs have at least one shared array (relationship of dependence is also considered).
2) All aligned dimensions of the shared array coincide.
3) The shapes of the shared arrays coincide across subroutines.

Figure 10:
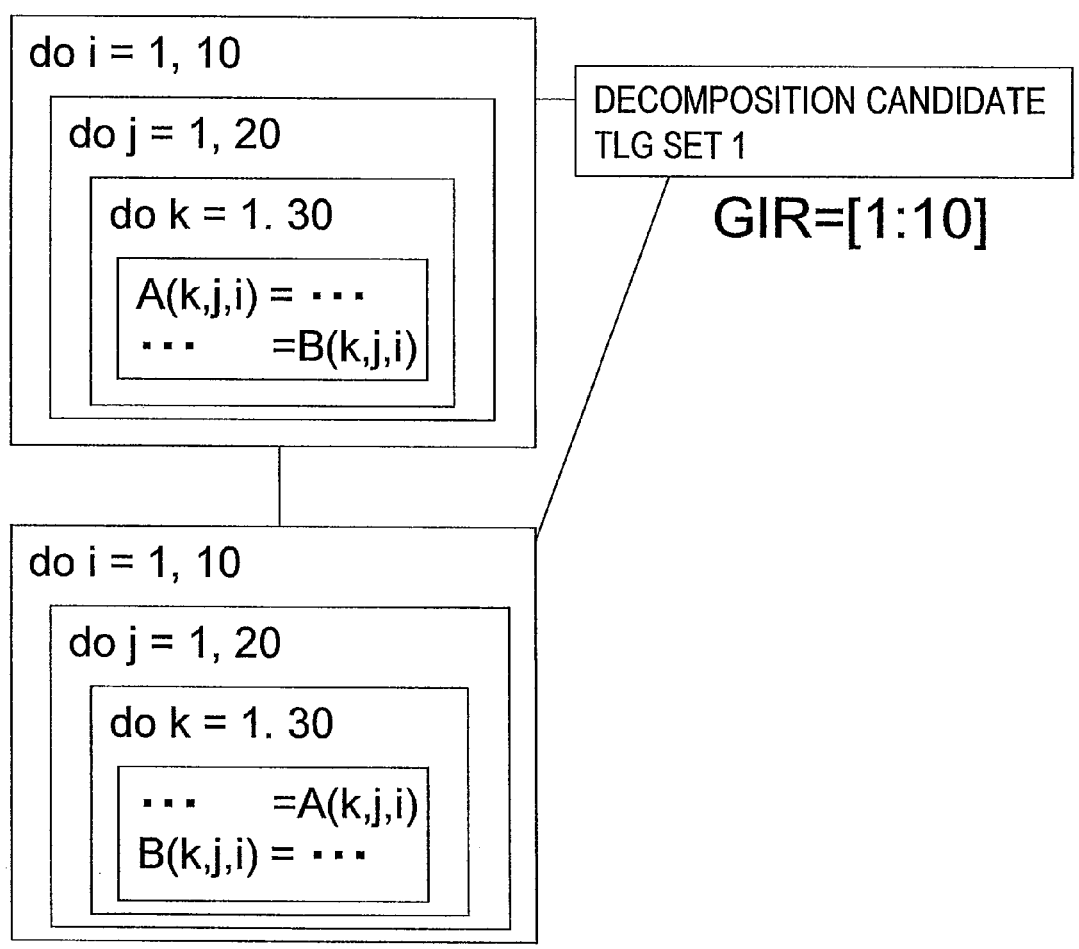
FIG. 10 is an explanatory diagram describing the specific example of division steps of loops according to the embodiment of this invention.

Then, as illustrated in FIG. 10, a division candidate TLG set is created. For this creation, when there is nested TLGs, a TLG set of the highest cost is selected, and the selected TLG set is set to a division candidate. Then, for respective division candidate TLG sets, a GIR is calculated. In this way, it is possible to cover entire codes in a program. Specifically, the TLG set 1 is set as division candidate TLG set 1, and GIR is [1:10].

Then, a division reference area is determined. The division reference area is a memory area which should accommodate data used by the respective TLG sets. Specifically, a ratio of data sizes used in the division candidate TLG sets is calculated. On this occasion, when there are three division candidate TLG sets, the data size used in a set 1 is 300 k, the data size used in a set 2 is 200 k, and the data size used in a set 3 is 100 k, the ratio of data sizes is represented as 3:2:1.

Based on this ratio, the minimum memory area (smaller one in capacity out of the local memory and the distributed shared memory) is assigned to the respective division candidate TLG sets. Specifically, the division candidate TLG sets are decomposed such that the data used in the division candidate TLG set is accommodated in an area smaller than the minimum memory area. It should be noted that, actually, data used in the division candidate TLG set can be loaded on an area other than the area assigned on this occasion, but this processing is carried out as a rough estimate of the division.

As a result, the data used in the respective division candidate TLG sets after the division can be simultaneously loaded on the local memory. It should be noted that whether or not the data is actually loaded on the memory is determined by the scheduling and a memory management routine.

Then, a block size is determined.

First, a division candidate TLG set with the highest cost is set as a reference for determining the block size. When a plurality of divisions are necessary, for a division candidate TLG set, a maximum division number is employed. On this occasion, the maximum division number is the maximum number of divisions when the configuration of the processor cores (PCs) in the processor group (PG) subject of the assignment, and an overhead due to the parallel processing are considered. When the number of the CPUs is one, the maximum division number is the number of iterations of the loop. Subsequently, a TLG set for which the plurality of divisions are necessary will not be selected as a division candidate TLG set. Then, again, a division candidate TLG set is to be created.

Figure 11:
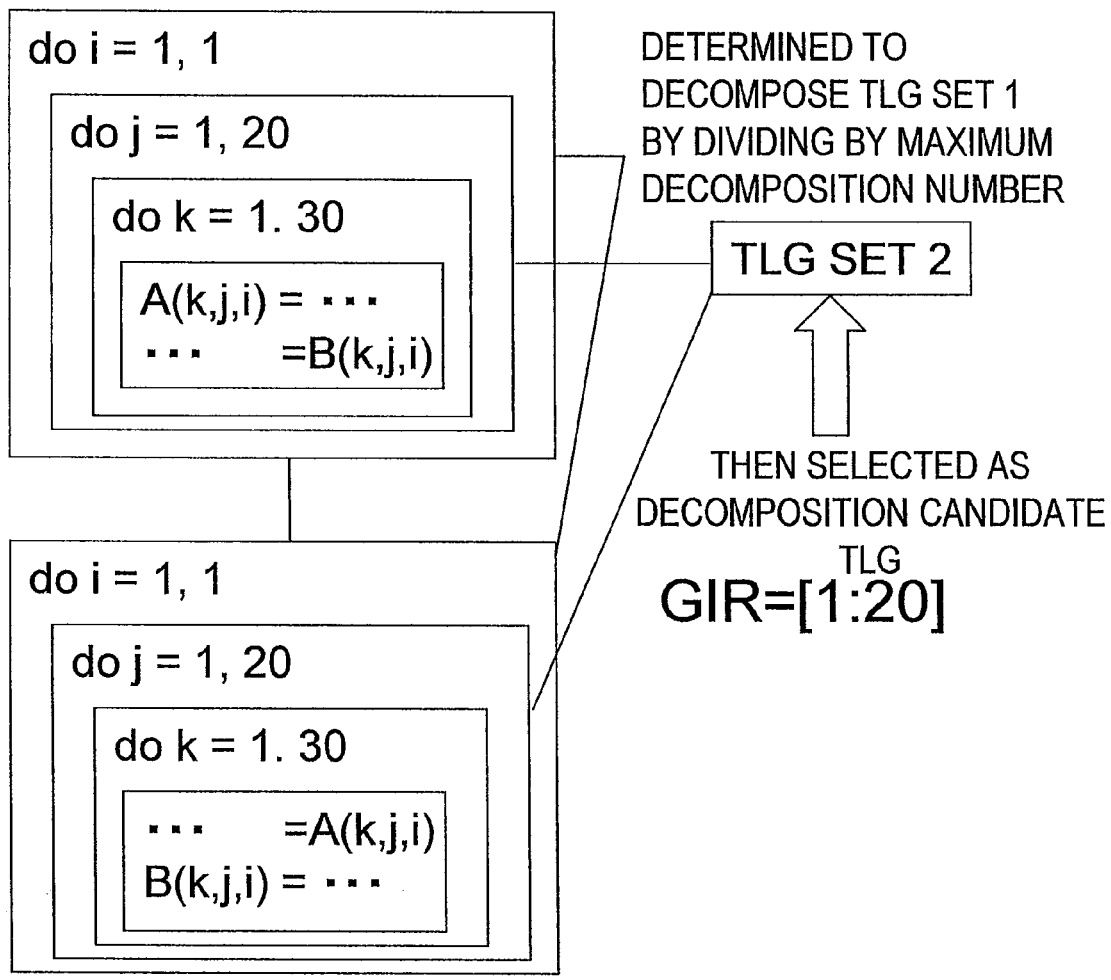
FIG. 11 is an explanatory diagram describing the specific example of division steps of loops according to the embodiment of this invention.

Specifically, as illustrated in FIG. 11, the TLG set 1 is decomposed by the maximum division number, and hence a next TLG set 2 is selected as a division candidate TLG. The GIR of the TLG set 2 which has become the division candidate is represented as [1:20].

A description is now given of steps of determining a block size.

First, a block size determination preprocessing is carried out. A division number which causes data accessed by a division candidate TLG set which servers as a reference is smaller in size than the division reference area is calculated. On this occasion, only the size of the data to be accessed is considered, and access to data referenced indirectly is not considered. The division number is set to an integral multiple of the number of the processor groups. The division of the respective loops in the TLG set is tried by the obtained division number.

Specifically, the division of the outer most loop (loop controlled by i) into four divisions is tried. The size of the array variables A and B to be accessed is represented as [k,j,i]=[1: 30,1:20,1:3]. The total data size is represented as 30×20×3× 2=3600.

Then, a block size is determined.

Based on an array access range after the division, templates for all local arrays in the TLG set are created, and sizes of the created templates are considered as tentative block size. A detailed description is later given of the creation of templates. On this occasion, too, the access to array data indirectly referenced is not considered. When the creation of templates fails, the division number is increased, and the creation is retried starting from the block size determination preprocessing.

By using the determined tentative block size, it is judged whether the assignment to the division reference area is possible. In this step, when data is indirectly referenced, the dimension thereof is determined by using declared size of the array. When the array indirectly referenced cannot be fit in the block, it may be determined to load the array on the shared memory.

When the data used in the TLG set can be assigned to the tentative block size, the division number upon the creation of the templates is employed (in other words, further division will not be carried out). Then, it is determined that the tentative block size is the block size.

On the other hand, when the data used in the TLG set cannot be assigned to the tentative block size, the division number is increased and the block size determination is repeated again from the block size determination preprocessing. Further, when the assignment cannot be achieved even by the maximum division number, subsequently, the TLG set which cannot be assigned will not be selected as a division candidate TLG. Then, again, a division candidate TLG set is to be generated.

Then, the division number is determined.

For the respective division candidate TLG sets, based on the block size determined before, the number of blocks which can be accommodated in the area determined by the division reference area determination is calculated, and the division number enabling the assignment is obtained. As a result, when the assignment of any of the division candidate TLG sets fails, a division candidate TLG set is generated again.

On this occasion, for the division candidate TLG set which could not be assigned, the maximum division number is employed, and, subsequently, the TLG set which could not be assigned is not selected as a division candidate TLG set, and the block size is not calculated again. The data size of the division candidate TLG set for which the division number has already been determined is subtracted from the size of the local memory, and, based on ratios of the data sizes of the still remaining division candidate TLG sets, TLG sets are assigned again. Respective loops in the division candidate TLG set for which the division number has been determined are set to local memory management macro task candidates.

Specifically, an example in which the data size used by the TLG set 1 is 300 k, the data size used by the TLG set 2 is 200 k, and the data size used by the TLG set 3 is 100 k is considered. It is assumed that the block size can be determined based on the TLG set 1. When the assignment of the TLG set 2 fails even for the maximum division number, and the TLG set 2 contains a TLG set 4, a TLG set 5, and a TLG set 6, they are added to a next division candidate TLG set.

When the division number of the loop with which all the data can be loaded on the local memory is determined, information on which data is accessed in what pattern, and which data uses a block in which size, as assumed in the division, is recorded for assigning data to the local memory.

Then, the macro task division and the loop restructuring are carried out. The processing carried out on this occasion, is the macro task division, loop distribution, loop fusion, and the loop restructuring.

Figure 14:
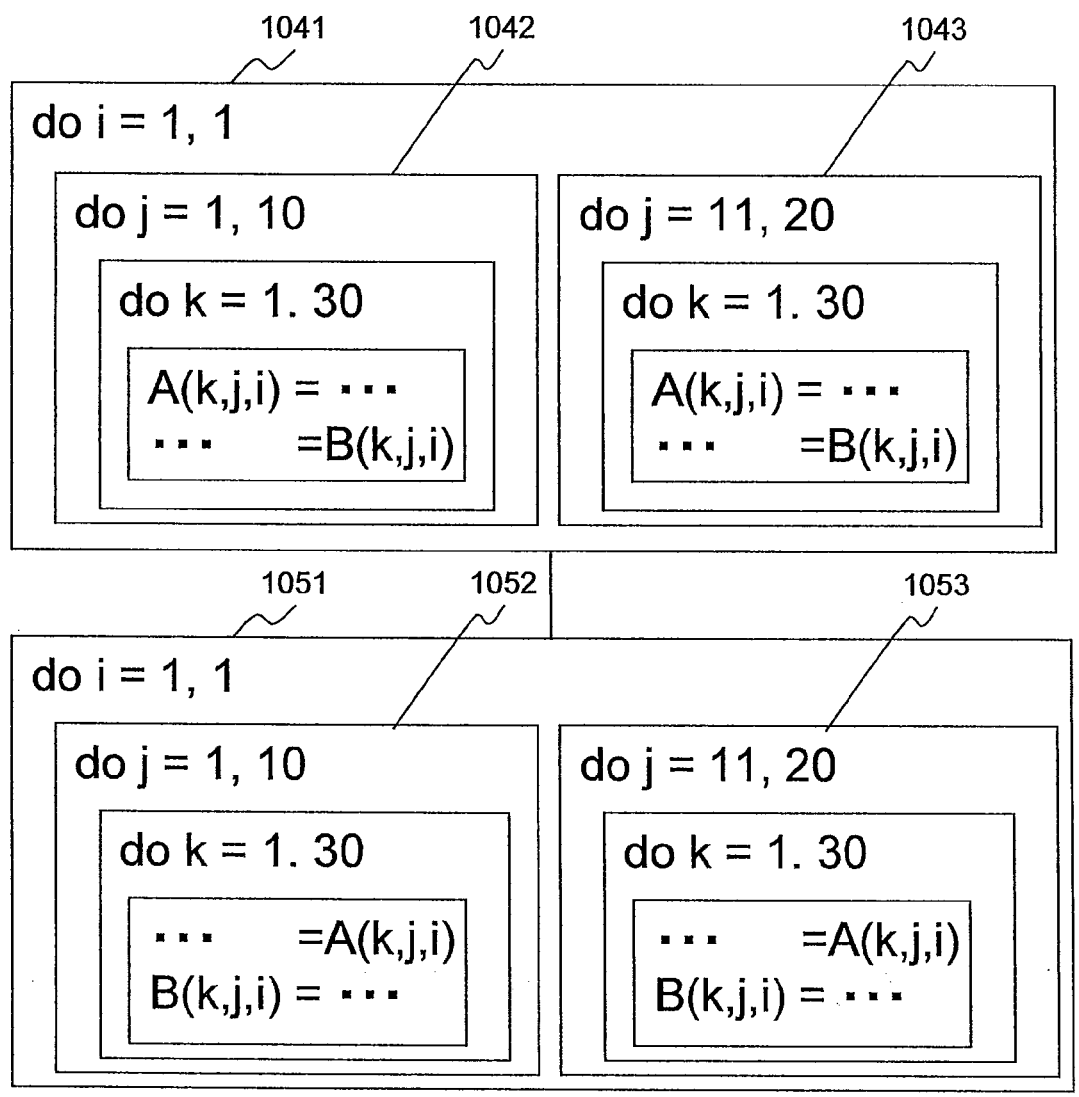
FIG. 14 is an explanatory diagram describing a specific example of creation of local memory management tasks (before distribution) according to the embodiment of this invention.
Figure 15:
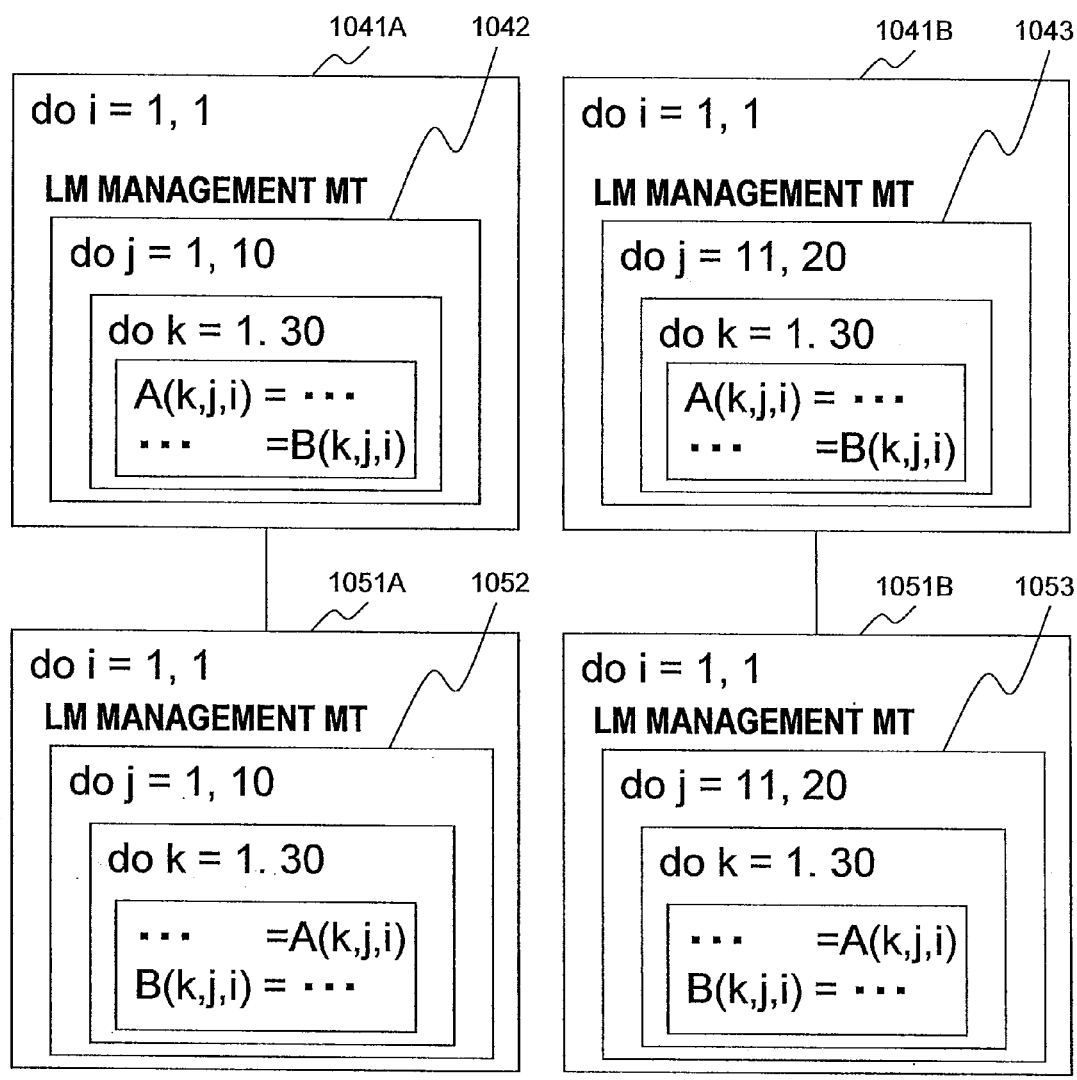
FIG. 15 is an explanatory diagram describing the specific example of creation of local memory management tasks (after distribution) according to the embodiment of this invention.

On this occasion, the loop distribution, which is later described referring to FIG. 14 and FIG. 15, is processing for reuse of data upon a plurality of division. The loop fusion is processing for reuse of registers.

Then, after the loop restructuring, by sequentially starting from a loop on an outer hierarchy, a macro task to which the composition number is set is searched, and a found macro task is set to a local memory management macro task. Inside the macro task set to the local memory management macro task, a macro task is not searched.

<Creation of Templates>

A description is now given of steps of creating templates.

According to this embodiment, a template is a unit for assigning an array variable to the local memory. The compiler prepares templates according to patterns of access to data by a program. The sizes of the provided templates are the same as the size of the block or the subblock. Moreover, the templates are prepared for respective dimensions (one-dimensional array, two-dimensional array, three-dimensional array, . . . ), and are larger than the size accessed by the program.

When the local memory is managed by using blocks, it is necessary to load various data (such as arrays different in shape and dimensions) on a block at the same address area. In other words, even the size of data can be accommodated in the block, the data may be a scalar variable declared as one dimension, or an array variable of two dimensions or three dimensions. Moreover, there is a case where data have the same dimensions, but the sizes of the dimensions of the data may be different from each other. In order to load those data on the same address space, all data may be converted into one-dimensional data, thereby matching to the memory address. However, for an array variable, index conversion is necessary, resulting in a deviation from a program written by a user. This index conversion makes a program difficult to understand, and causes difficulty in debugging and the analysis of the parallelism.

Then, in order to manage the local memory while the program is maintained readable, templates which have the same size as the blocks and the like are used. The template is a template storing an array variable. By storing necessary data in a template, it is possible to realize loading data on an arbitrary block in the local memory.

A template is created by the following steps.

First, for all arrays in a TLG set, the smallest powers of 2 which are larger than the access sizes of the respective dimensions are obtained. Then, a tentative template having respective dimensions of the obtained sizes is created.

In the example described before, for the outer most loop controlled by the variable i, division into four loops is tried. For example, by decomposing into four loops of i=1 to 3, 4 to 6, 7 to 8, and 9 to 10, two loops of three iterations, and two loops of two iterations are obtained. The access sizes of both of the array variables A and B in the decomposed loops are represented as [k,j,i]=[1:30,1:20,1:3]. It should be noted that for the loop for the third dimension, the larger number of iterations of the loops is selected, which is three iterations.

Then, the size of the tentative template is calculated. The respective dimensions of the template are powers of 2 which are larger than the sizes of the respective dimensions of the array variables, and hence the size of the template is represented as 32×32×4=4 k elements. Then, the largest size of the tentative template is set to the block size. In the example described above, the block size is 4 k elements.

Then, the division reference area size is divided by the block size to obtain a quotient (division reference area size/block size). When the obtained quotient is one or more, by rounding down after the decimal point, the number of blocks which can be prepared (Block_num) is obtained. On the other hand, when the obtained quotient is less than one, no block can be created for this template size, and, thus, it is determined that the creation of template failed.

Moreover, the block size is divided by the size of the respective templates (block size/size of respective templates), and the quotient is set to the number of the subblocks.

In the example described above, the area of the local memory to be divided is 12 k elements, the number of blocks which can be prepared is determines as 12 k/4 k=3. Finally, three templates of 4 k elements, [1:32,1:32,1:4,0:2], are provided. The template size and the template number are determined, and hence the division number of the loop is determined as four.

In other words, in this processing, by considering the entire program, an optimal block size is determined. For this purpose, the division number of the program for loading the data used by the macro task (working set) on the local memory is determined. Then, the division number is selected so that the block size is larger than the divided data size.

Example 1 of Determination of Local Memory Management Macro Task

Figure 12:
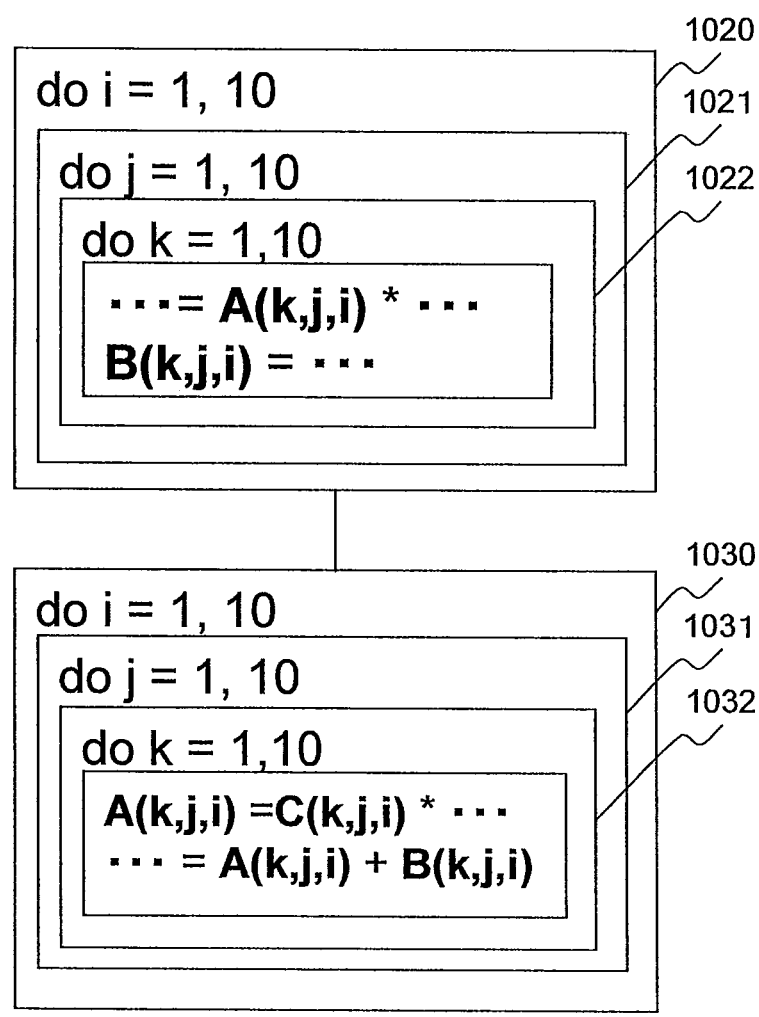
FIG. 12 is an explanatory diagram describing a specific example of steps of determining a block size according to the embodiment of this invention.
Figure 13:
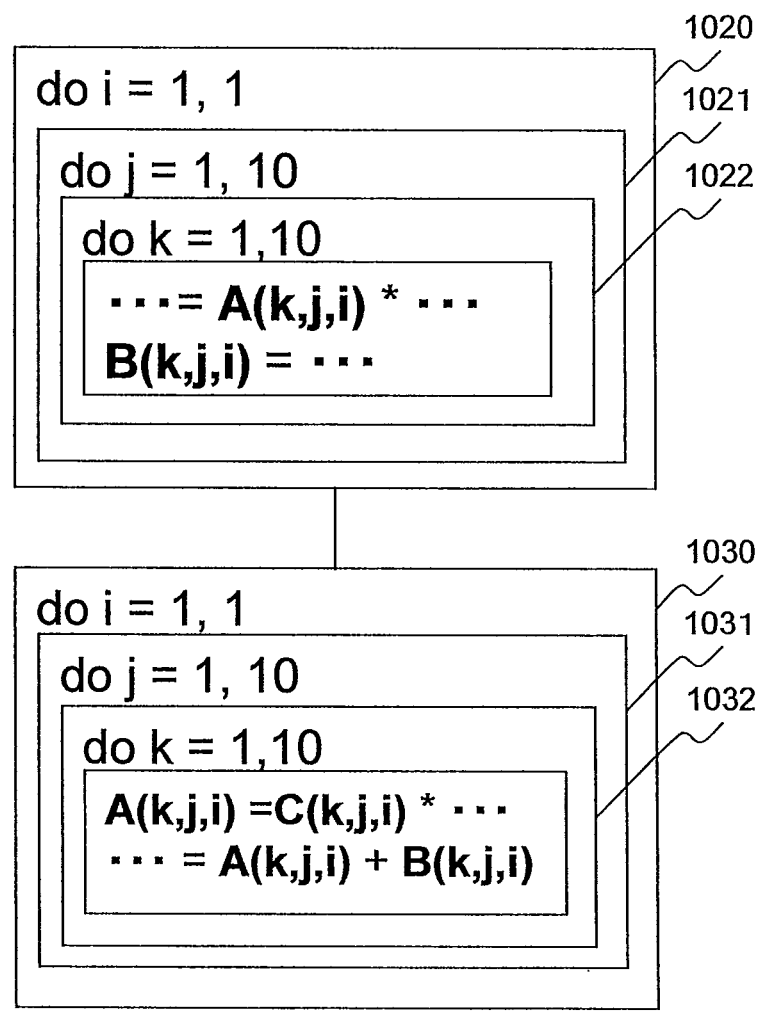
FIG. 13 is an explanatory diagram describing the specific example of steps of determining the block size according to the embodiment of this invention.

Next, referring to FIGS. 12 to 13, a description is given of another specific example of steps of determining the block size.

In order to determine the block size, first, data accessed in a loop is analyzed to create templates in a size of a power of two.

In this example, it is assumed that the size of the local memory (excluding a flag area) is 2 kB, the size of the respective array element is 4B/element, and the distributed shared memories are not considered.

First, a case in which the outer most loop is decomposed according to the maximum decomposition number is considered.

As illustrated in FIG. 12, the outer most loop 1020 controlled by a variable i, an inner loop 1021 controlled by a variable j inside the loop 1020, and the inner most loop 1022 controlled by a variable k inside the loop 1021 are included in a three-nested-loop structure.

Specifically, when the loop division is not considered, the size of the array variables A, B, and C used in the inner most loop 1022 is represented as [k,j,i]=[1:10,1:10,1:10]. According to the steps described before, a tentative template is created. The size of the tentative template to be created is represented as [k,j,i]=[1:16,1:16,1:16]. The block size necessary for this tentative template is 16×16×16×4=16 kB. The size of the local memory is 2 kB, and hence no block can be prepared. Then, the division of the outer most loop 1020 is considered.

As illustrated in FIG. 13, the outer most loop (variable i) 1020 is decomposed according to the maximum division number (division into ten portions). The maximum division number is the number of iteration of a loop. It should be noted that, when a necessary block number cannot be attained by the division of an outer loop up to the limit, an inner loop is preferably decomposed.

In this case, the size of the array variables A, B, and C used in the inner most loop 1022 is represented as [k,j,i]=[1:10,1:10,1:1]. The size of the tentative template to be created according to the above-described steps is represented as [k,j,i]=[1:16,1:16,1:1]. The block size necessary for this tentative template is 16×16×1×4=1 kB. The size of the local memory is 2 kB, and hence the number of blocks which can be provided is the division reference area size (2 kB)/block size (1 kB)=2. This loop uses three array variables, and hence necessary blocks are not obtained in this state. Then, the division of the inner loop 1021 is considered next.

When the inner loop 1021 is decomposed into two loops (two equal portions), the size of the array variables A, B, and C used in the inner most loop 1022 is represented as [k,j,i]=[1:10,1:5,1:1]. The size of the tentative template to be created according to the above-described steps is represented as [k,j,i]=[1:16,1:8,1:1]. The block size necessary for this tentative template is 16×8×1×4=512B. The size of the local memory is 2 kB, and hence, when the number of blocks which can be prepared is calculated by the division reference area size (2 kB)/block size (412B), the number of blocks which can be prepared is 4.

Thus, the blocks to which the three array variables used in this loop are to be assigned can be provided, and hence the size and the number of the blocks are determined. The template to be created is represented by [1:16,1:8,1:1,0:3].

Then, loops obtained by decomposed the inner loop 1021 into a loop for j=1:5 and a loop for j=6:10 are to be local memory management macro tasks.

Loops 1030 and 1031 are decomposed similarly.

In this way, when the division of an outer loop fails, by decomposing an inner (another dimension) loop (multi-dimension division), local memory management tasks suitable for the local memory size can be determined.

Example 2 of Determination of Local Memory Management Macro Task

Next, referring to FIGS. 14 to 15, a description is given of another specific example of creation of local memory management tasks.

In this example, as in the previous example, it is also assumed that the size of the local memory (excluding a flag area) is 2 kB, and the size of the respective array element is 4B/element, and the distributed shared memories are not considered.

As illustrated in FIG. 14, this program contains three nested loops controlled by variables i, j, and k. Inside the outer most loop 1041 controlled by a variable i, an inner loop 1042 (j=1:10) and an inner loop 1043 (j=11:20) are contained. Similarly, inside the outer most loop 1051 controlled by the variable i, an inner loop 1052 (j=1:10) and an inner loop 1053 (j=11:20) are contained.

The loop 1051 is executed after the loop 1041, the loop 1042 and the loop 1052 use the same data (array variable A[1:30,1:10,1:1] and array variable B[1:30,1:10,1:1]), and the loop 1043 and the loop 1053 use the same data (array variable A[1:30,11:20,1:1] and array variable B[1:30,11:20, 1:1]).

However, this program is executed in a sequence of the loop 1042, the loop 1043, the loop 1052, and the loop 1053, and hence the same data cannot be reused while the data are loaded on the local memory. Thus, as illustrated in FIG. 15, the outer most loop 1041 is decomposed into an inner loop 1042 (j=1:10) and an inner loop 1043 (j=11:20). Similarly, the outer most loop 1051 is decomposed into an inner loop 1052 (j=1:10) and an inner loop 1053 (j=11:20).

By this division, the decomposed outer most loop 1041A and 1051A can be sequentially executed (in other words, the inner loop 1042 and the inner loop 1052 are sequentially executed). Therefore, array data used in the loop 1042 can be directly used in the loop 1052. In other words, between the end of execution of the loop 1041A and the start of execution of the loop 1051A, transfer of data (array variables) does not occur.

Similarly, the decomposed outer most loop 1041B and 1051B can be sequentially executed (in other words, the inner loop 1043 and the inner loop 1053 are sequentially executed). Therefore, array data used in the loop 1043 can be directly used in the loop 1053. In other words, between the end of execution of the loop 1041B and the start of execution of the loop 1051B, transfer of data (array variables) does not occur.

In this way, when the execution sequence of a program and data used by the program are not aligned, by executing distribution of loops, loops handling the same data are to be continuously executed. As a result, when the loops are executed, data transfer can be prevented from occurring.

Example of Steps of Creating Templates

Figure 16:
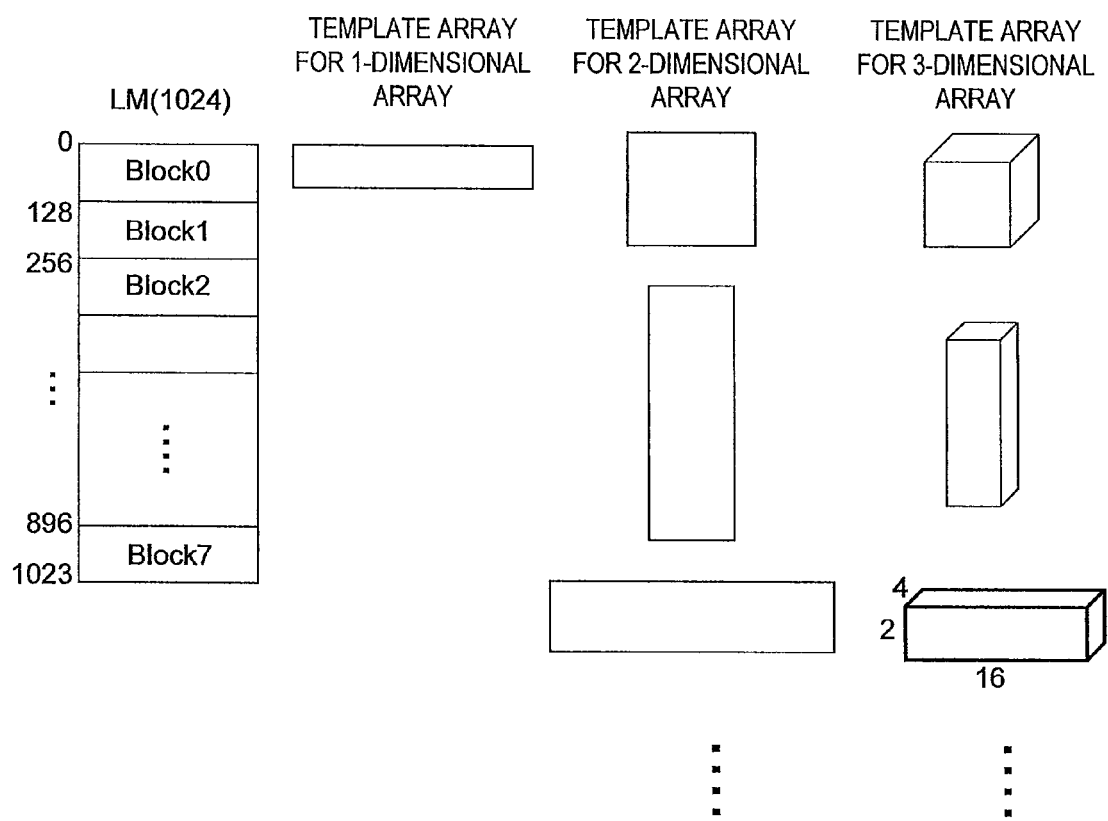
FIG. 16 is a diagram describing an example of steps of creating templates according to the embodiment of this invention.

FIG. 16 illustrates an example of steps of creating templates according to the embodiment of this invention.

A template is a unit for, in order to handle a macro task on the local memory, assigning an array variable to the local memory.

As templates, those for one-dimensional arrays, two-dimensional arrays, three-dimensional arrays are provided, and the shapes thereof vary according to array variables used in a macro task. For example, as the two-dimensional arrays, those in square shapes which have the same upper bound for the respective indices of the array variable, and in rectangular shapes (vertically longer, horizontally longer) which have different upper bounds for indices are provided for matching the size of array variables used in a macro task.

The size of a template is larger than the size of data used in a local memory management macro task. Further, as the upper bound of the indices for respective dimensions of a template, the smallest power of 2 which is larger than the upper bound of the indices for respective dimensions of an array variable used in the local memory management macro task is selected. Therefore, even when a template may change in shape, the size thereof is the same as the size of the block, the subblock, or the like.

Thus, the size of a template is equal to the block size or the block size divided by a power of 2. As a result, a template in the minimum size for accommodating data is created, and a program (loop) is decomposed so that this created template accommodates the data. Then, when an array variable is assigned to the local memory, the array variable can be assigned to a block or the like in the same size, whereby the memory capacity of the local memory can be used without a waste.

By using assigned templates, a template assigned to a block 0 uses the memory space of the block 0, and a template assigned to a block 1 uses the memory space of the block 1.

Templates in the same shape are provided corresponding to the number of the blocks. Then, a used template array is switched according to the block number. Therefore, the actually created template as the prepared template has a shape of a plurality of same templates arranged side by side (dimensions of an array variable on which data is loaded, and which is used+one dimension). The newly created dimension is a dimension for specifying the block, and the number of elements is the number of the blocks.

In other words, the dimensions of the template are larger than the dimensions of the array variable by one dimension. This is because, by switching among a plurality of array variables according to the index for the added dimension of the template, the block to be accessed is changed. It should be noted that the respective templates are assigned to different blocks (different addresses) in the local memory. When the shape and the size of array variables are the same, the same template can be used. For example, for loops decomposed equivalently, array variables of the same shape and the size can be used, and hence it is effective to provide this type of template.

For example, when the number of blocks is eight, and the size of the respective blocks is [1:2,1:16,1:4], a template of tempA[1:2,1:16,1:4,0:7] is assigned to the local memory. It should be noted that, on this occasion, when five array variables appears in a program, tempA[1:2,1:16,1:4,0:4] is employed to assign the template only to the blocks 0 to 4. The other blocks may be divided further into subblocks.

Figure 17:
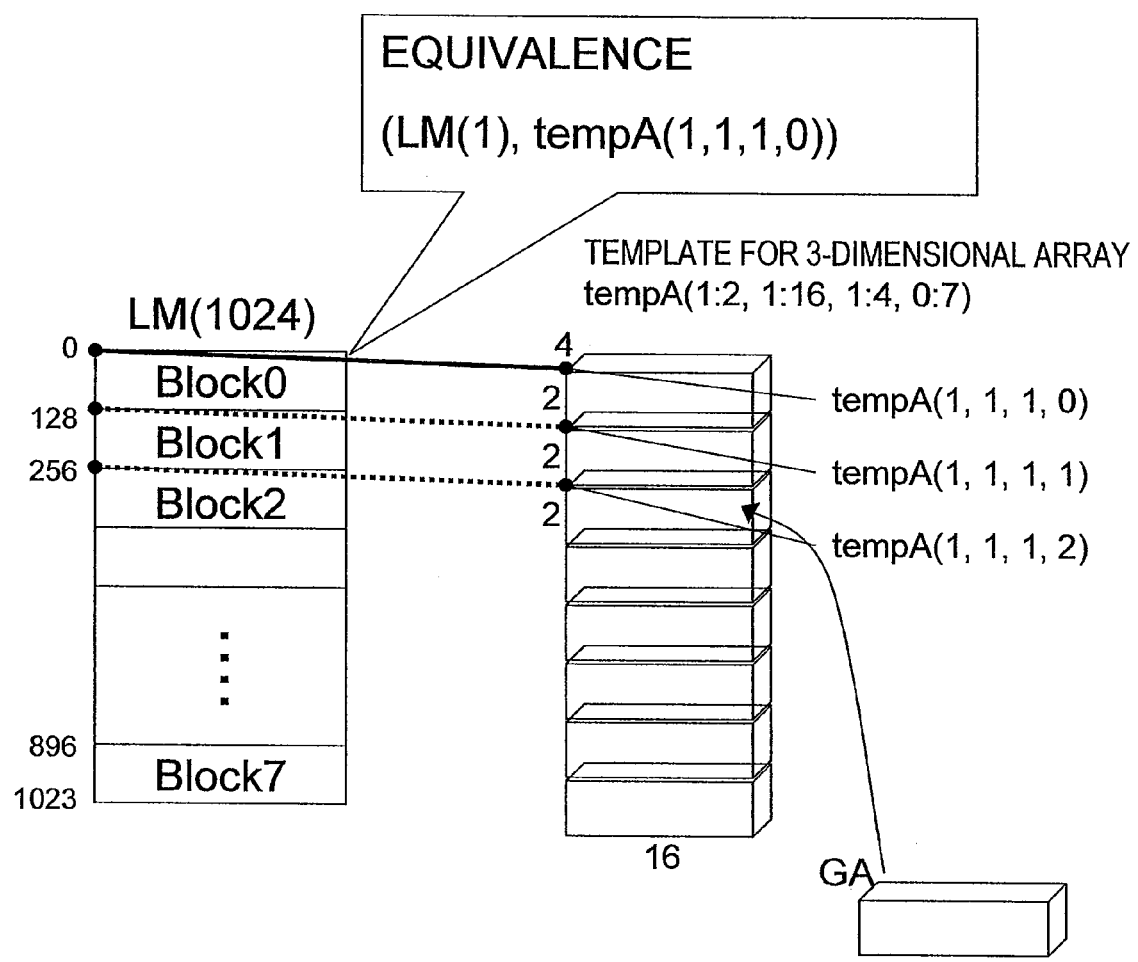
FIG. 17 is a diagram describing a status of a local memory to which a template is mapped according to the embodiment of this invention.

FIG. 17 illustrates a status of the local memory to which the template is mapped.

For the mapping of the template, in FORTRAN, EQUIVALENCE statement can be used. Specifically, by a declaration: EQUIVALENCE(LM(1), tempA(1,1,1,0)), to the block 0 in the local memory, the template A can be assigned.

The template A is a template for a three-dimensional array, and the respective dimensions are represented as tempA[1:2, 1:16,1:4,0:7]. Thus, to the block 0 (address 0 to 127), tempA [1,1,1,0] is assigned, and to the block 1 (address 128 to 255), tempA[1,1,1,1] is assigned.

In other words, as described before, the outer-most fourth dimension is not the dimension of the template itself, but represents the number of a block to which the template is assigned.

As a more specific example, by executing:

```
do dim3 = 1, 4
   do dim2 = 1, 16
      do dim1 = 1, 2
         tempA(dim1, dim2, dim3, 2) = GA(dim1, dim2, dim3)
      enddo
   enddo
enddo
```

Data in an array variable GA is stored into the local memory block 2.

Figure 18:
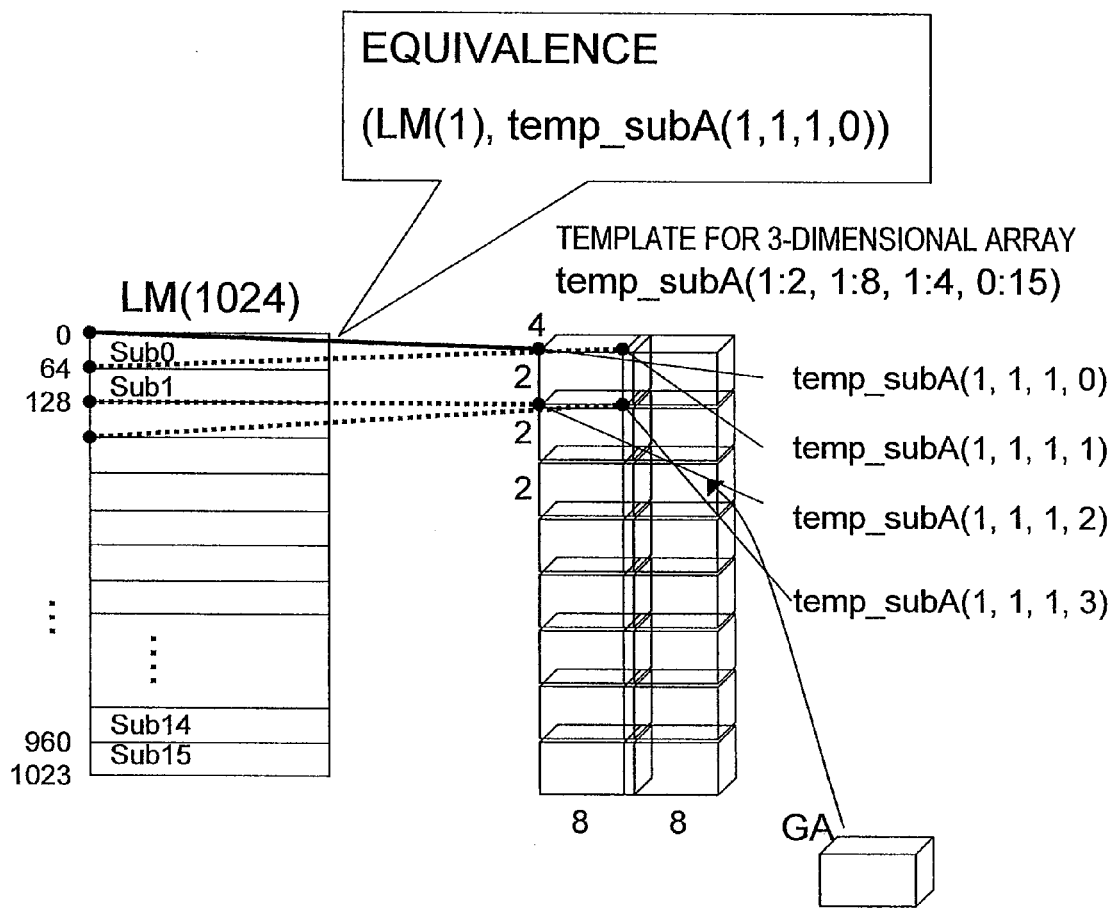
FIG. 18 is a diagram describing a status of a local memory to which another template is mapped according to the embodiment of this invention.

FIG. 18 illustrates a status of the local memory to which another template is mapped.

When an array size appearing in a program is represented as [1:2,1:8,1:4], which is different from the example described above, a template temp_subA[1:2,1:8,1:4,0:15] matching the subblock size is assigned to the local memory. In this way, according to the value of the outer most element, the subblock to be accessed is variable.

As described before, by a declaration: EQUIVALENCE (LM(1), temp_subA(1,1,1,0)) using EQUIVALENCE statement, to the subblock 0 in the local memory, the template (temp_subA) can be assigned.

The template A is a template for a three-dimensional array, and the size thereof is represented as tempA[1:2,1:8,1:4,0:15]. Thus, to the subblock 0 (address 0 to 63), temp_subA[1,1,1,0] is assigned, and to the subblock 1 (address 64 to 127), temp_subA[1,1,1,1] is assigned.

As a more specific example, by executing:

```
do dim3 = 1, 4
   do dim2 = 1, 8
      do dim1 = 1, 2
         temp_subA(dim1, dim2, dim3, 4) = GA(dim1, dim2, dim3)
      enddo
   enddo
enddo
```

Data in an array variable GA is stored in the local memory block 4.

In this way, based on information obtained by analyzing a program by the compiler, templates are created by identifying the shapes of array variables used in the program, and it is determined to which templates those variables are assigned. This can cause the one-dimensional address space of a memory to appear as multi-dimensional, thereby permitting a multi-dimensional array used in a program to be directly assigned to the memory.

<Creation of Code Image by Using Template Arrays>

Then, referring to FIGS. 19A to 34B, a description is given of a specific example of creation of a code image by using template arrays. Illustrations in FIGS. 19A to 34B illustrate, when the local memory size is 1024, the block size is 128, and the area of the local memory is divided into four blocks 101, four subblocks 102, four subsubblocks 103, and eight subsubsubblocks 104, how the compiler rewrites a code, and statuses of the local memory during the program execution.

Figure 19A:
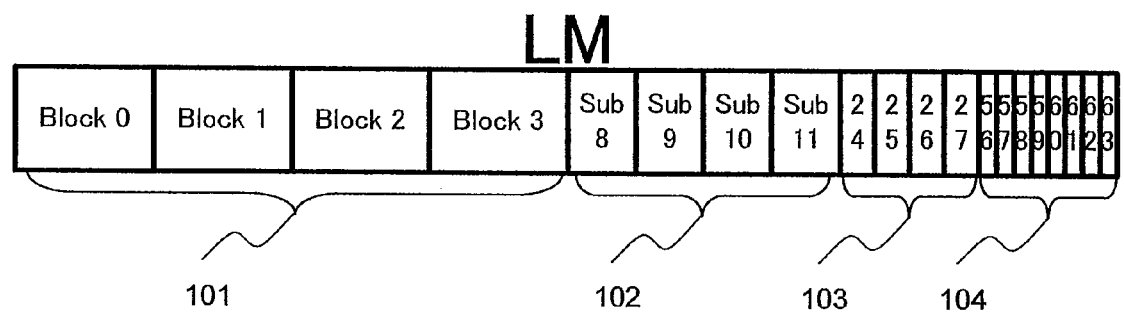
FIGS. 19A and 19B are explanatory diagrams describing a specific example of creation of a code image (status 1) according to the embodiment of this invention.
Figure 19B:
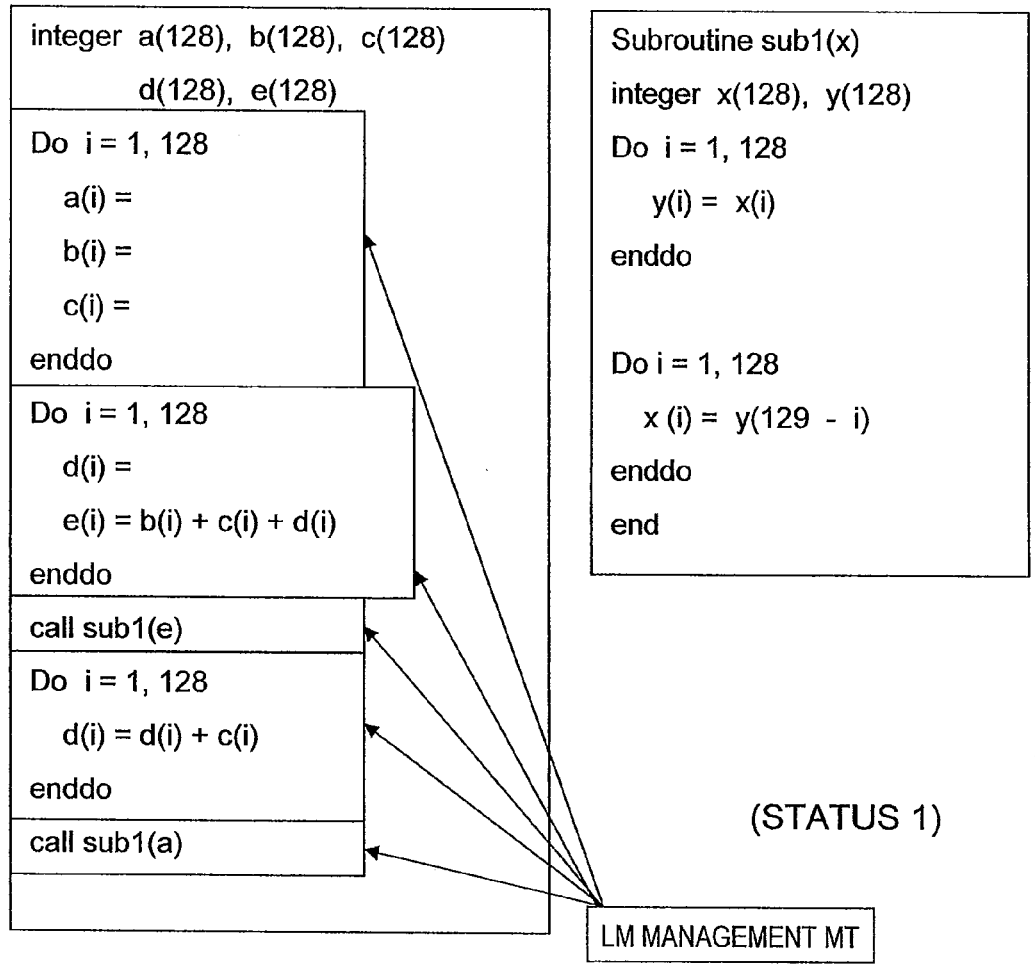

FIGS. 19A and 19B illustrate an original code before the compilation, and a status (status 1) of the local memory. In this original code, three loops and two subroutine calls are contained, and those loops and subroutine calls become local memory management macro tasks.

Figure 20A:
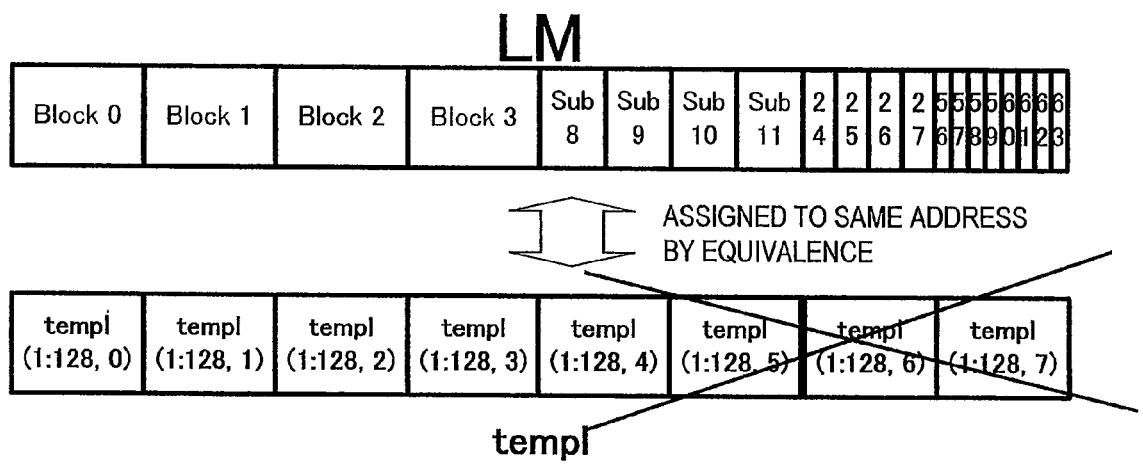
FIGS. 20A and 20B are explanatory diagrams describing the specific example of creation of the code image (status 2) according to the embodiment of this invention.
Figure 20B:
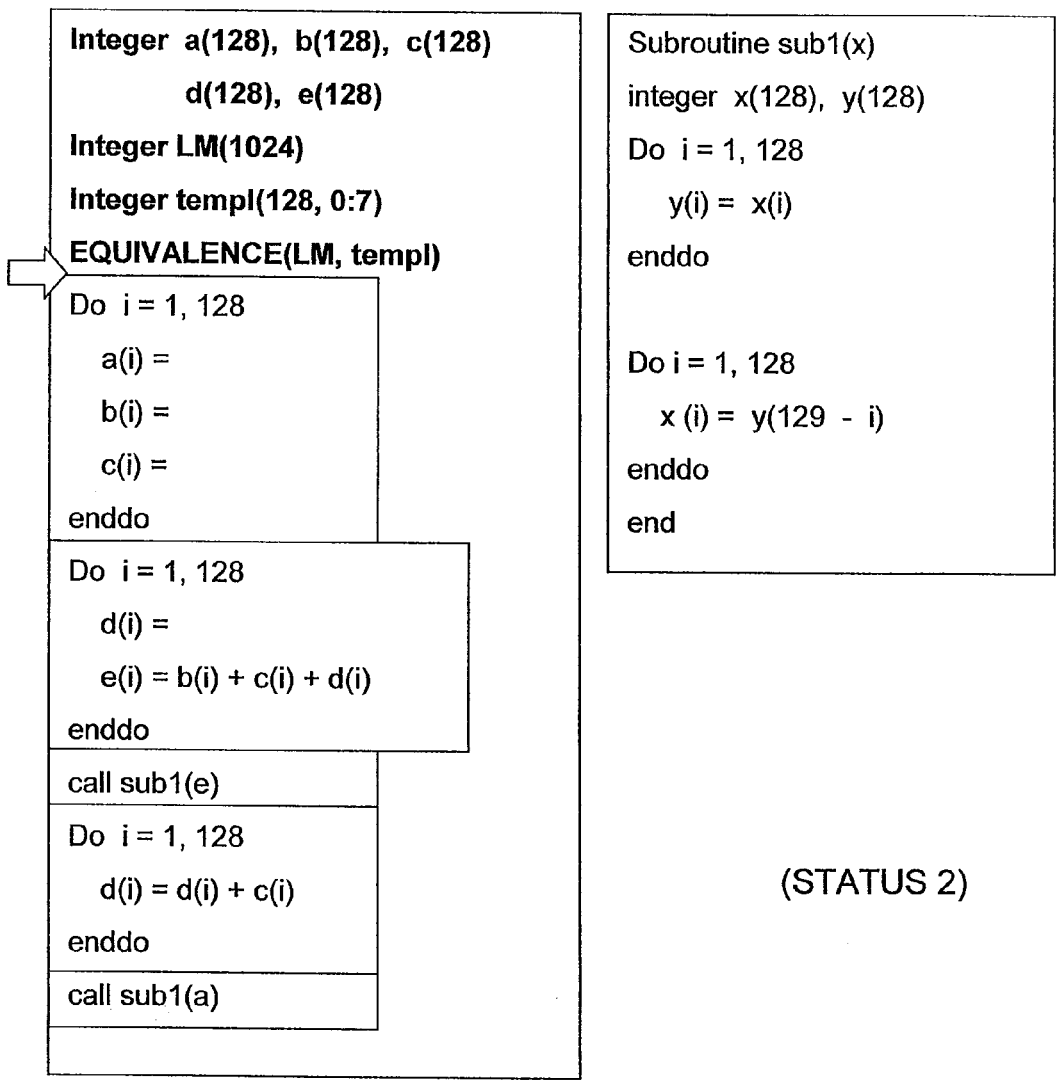

FIGS. 20A and 20B illustrate a status (status 2) in which a template is set to the blocks and the like. A local memory (LM) area and a template array are defined, and, by means of the EQUIVALENCE statement, the template is assigned to the address space of the local memory. By this assignment, the local memory and the template refer to the same area. Then, by changing the index (0 to 7), a corresponding area changes. It should be noted that, though an area starting from templ(1,4) is declared by the template arrays, because this area is assigned to the subblocks and the like, this area is not used as blocks.

Specifically, the following statements are inserted into the program.
Integer a(128), b(128), c(128), d(128), e(128)
Integer LM(1024)
Integer templ(128, 0:7)
EQUIVALENCE (LM, templ)
As a result, the template is assigned to the local memory.

Figure 21A:
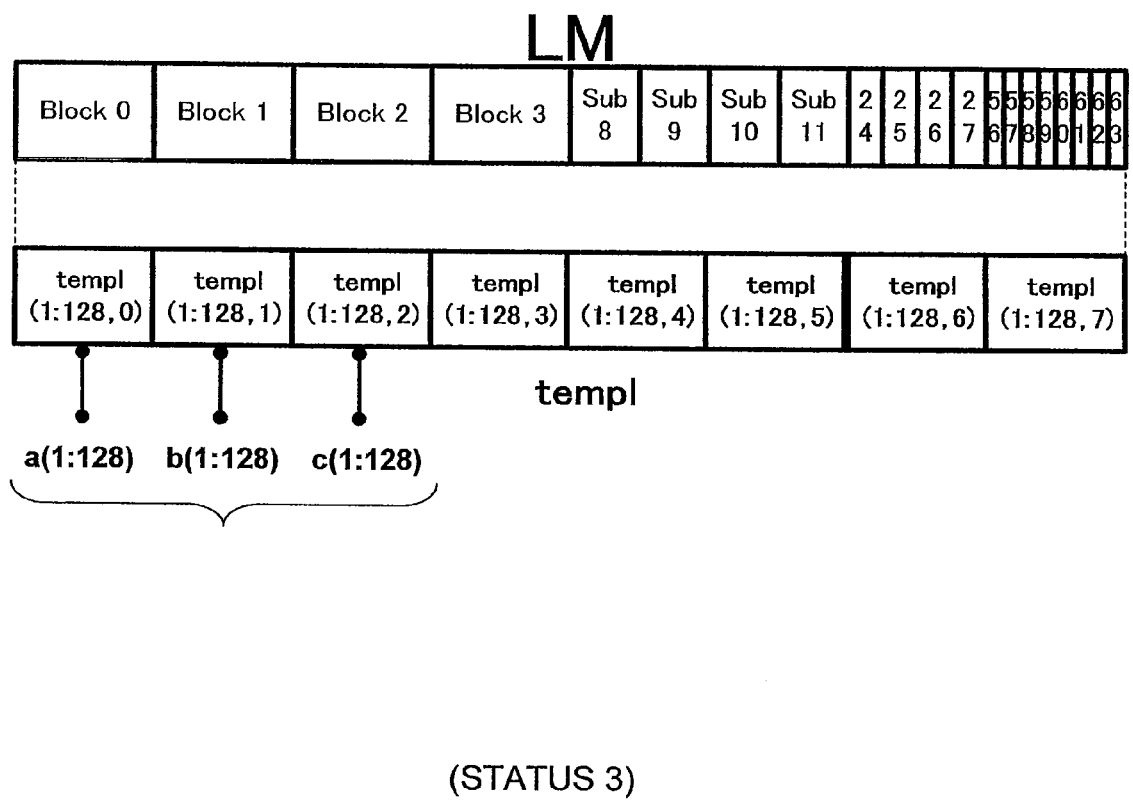
FIGS. 21A and 21B are explanatory diagrams describing the specific example of creation of the code image (status 3) according to the embodiment of this invention.
Figure 21B:
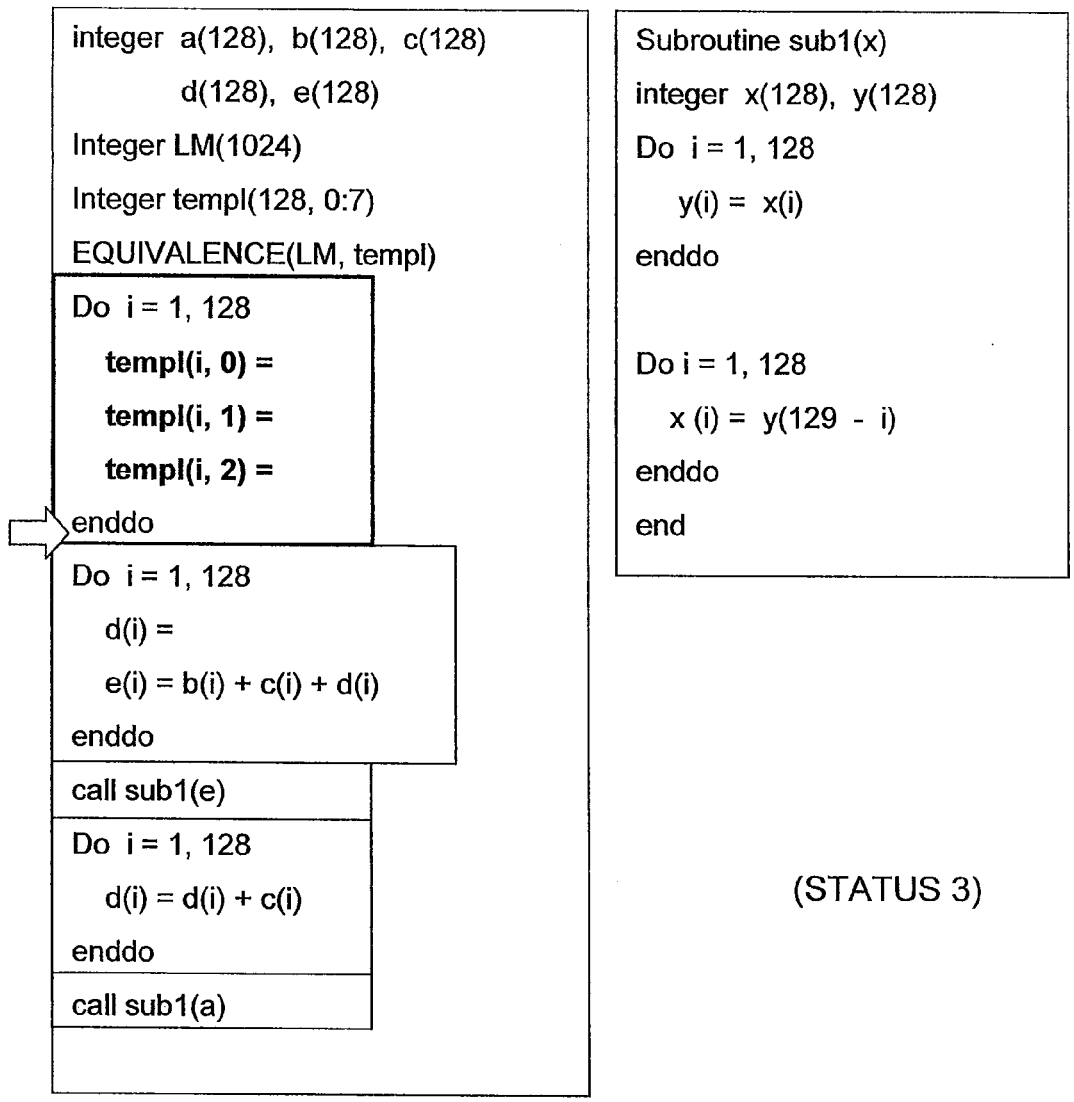

FIGS. 21A and 21B illustrate a status (status 3) of conversion into template arrays. Arrays which are to be loaded and used on the local memory are converted into the newly defined template arrays. By converting the arrays in the original code into the template arrays, the local memory is to be used. By changing the value of the dimension (index) for specifying the block, a block (address of the local memory) to be used can be changed.

Specifically, array names a(i), b(i), and c(i) in the original code are rewritten into templ(i,0), templ(i,1), and templ(i,2).

Figure 22A:
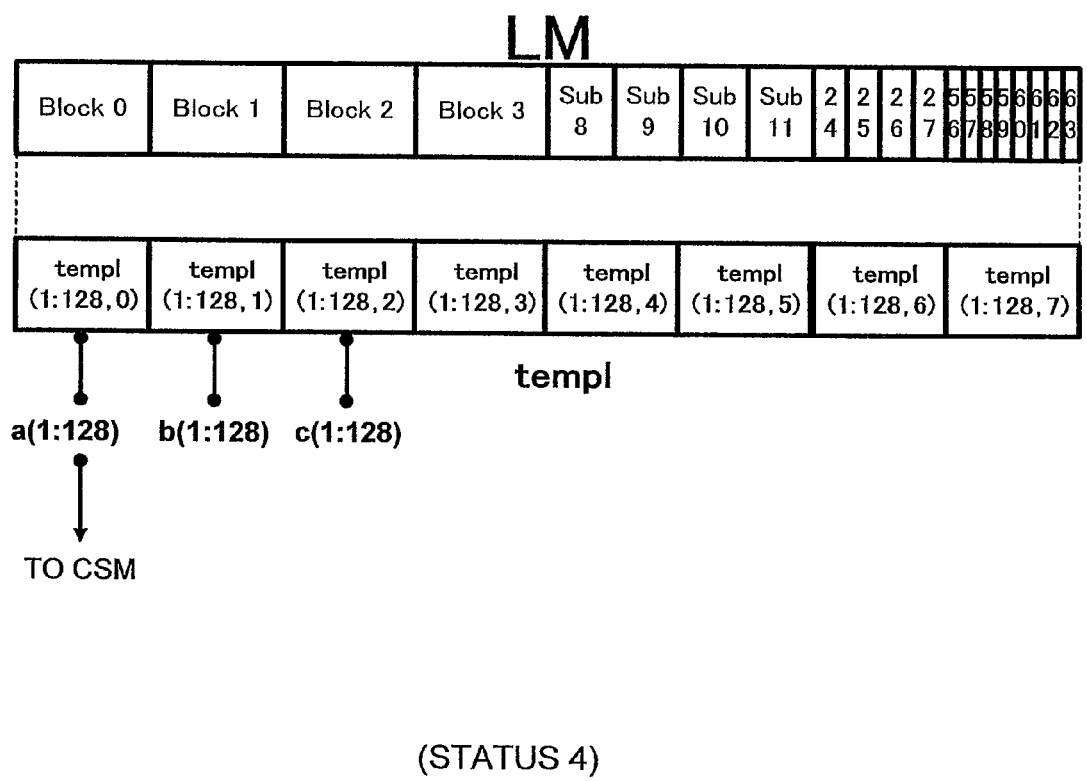
FIGS. 22A and 22B are explanatory diagrams describing the specific example of creation of the code image (status 4) according to the embodiment of this invention.
Figure 22B:
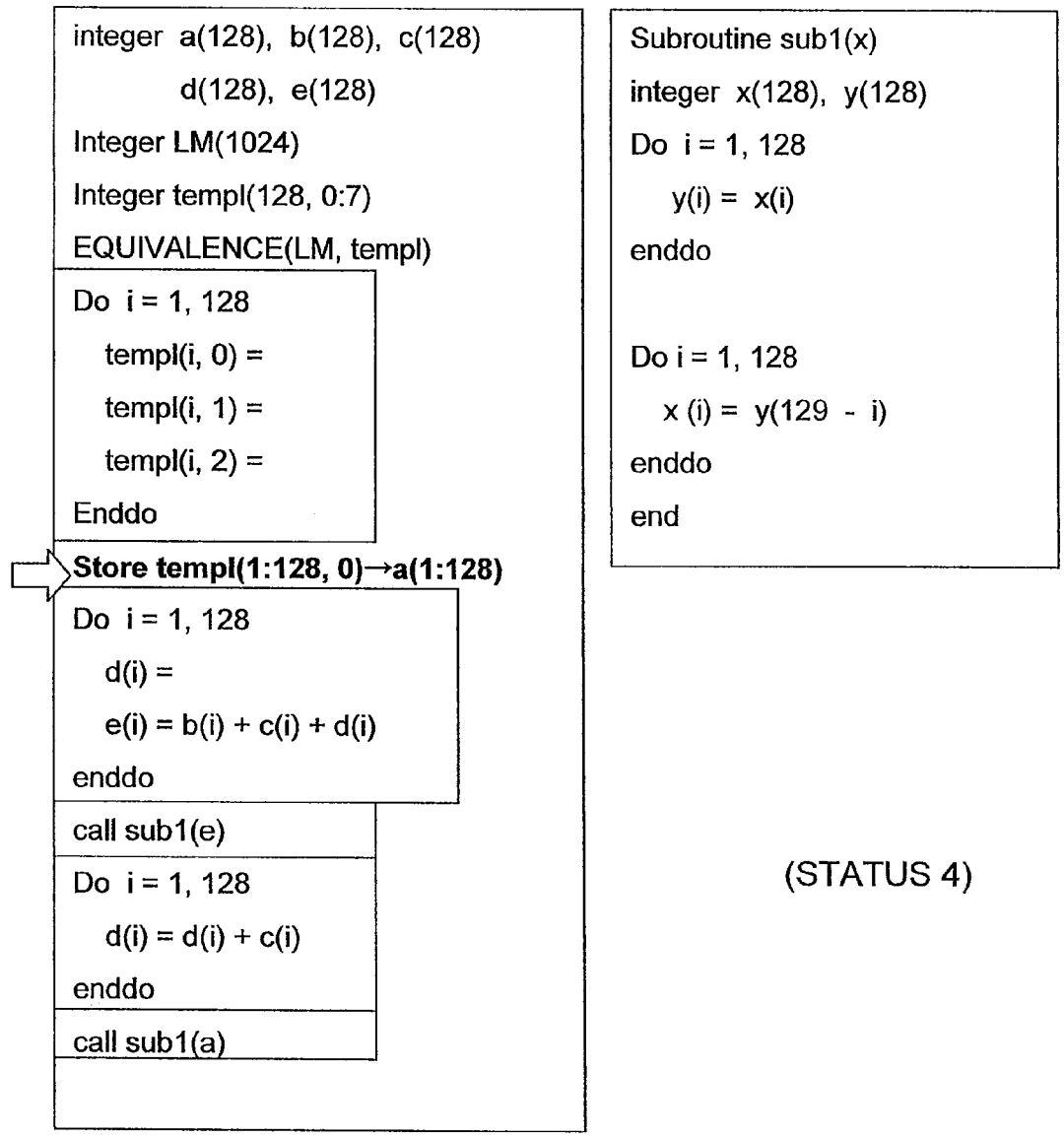

FIGS. 22A and 22B illustrate a status (status 4) in which data are unloaded from the blocks. The second macro task uses four arrays b, c, d, and e, and, thus, four blocks are necessary. When, upon a first macro task being finished, a necessary number of blocks for the macro task to be executed next are not available, the necessary number of blocks are freed according to the unloading priority. Specifically, the three arrays a, b, and c are loaded on the local memory, but the arrays b, and c are used continuously. Thus, in order to load the array e, the array a is to be unloaded. Data stored in the block to be unloaded are transferred to the centralized shared memory 28 or 14. Thus, an instruction for transferring the data stored in the template array to the centralized shared memory 28 or 14 is inserted in the original code.

Figure 23A:
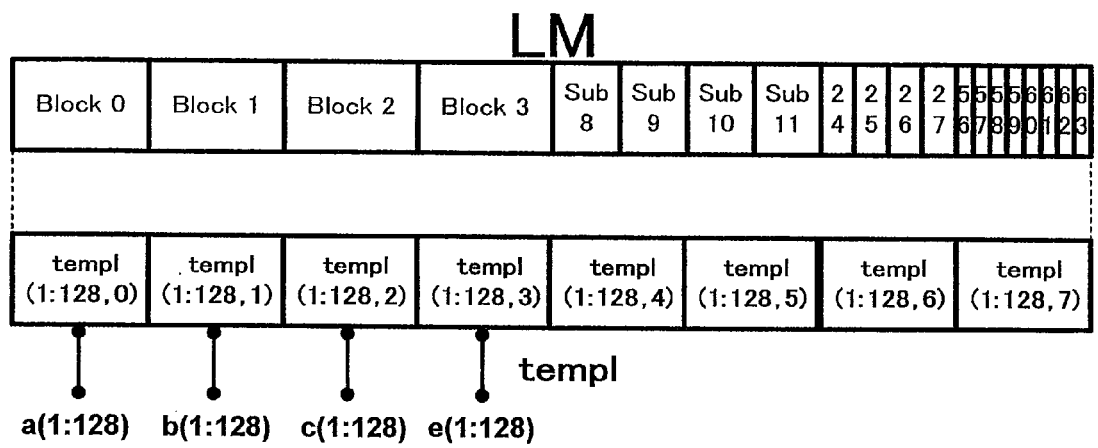

FIGS. 23A and 23B illustrate a status (status 5) of conversion to the template arrays. As the status illustrated in the status 3 (FIGS. 21A and 21B), the array which is to be loaded and used on the local memory is converted into the newly defined template array. The array a is unloaded from the block 0, and the array d is stored.

Figure 24A:
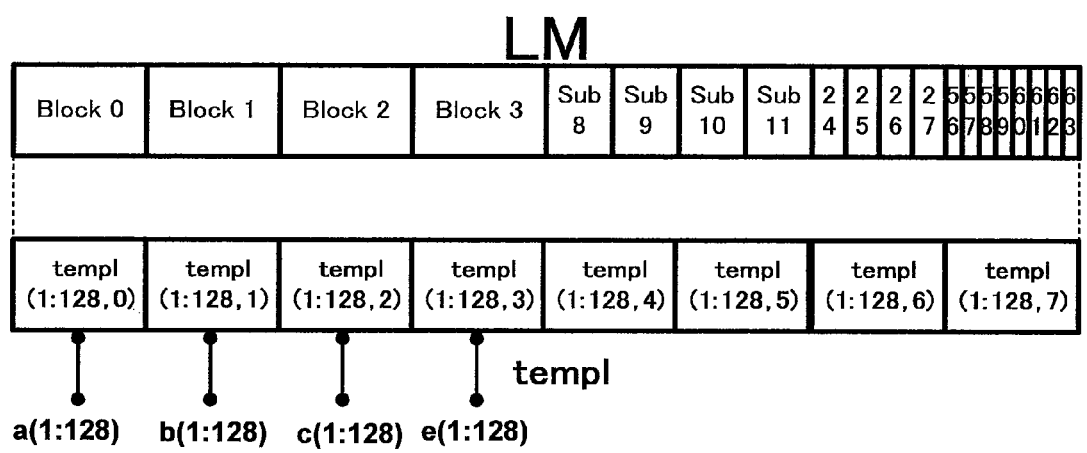
FIGS. 24A and 24B are explanatory diagrams describing the specific example of creation of the code image (status 6) according to the embodiment of this invention.
Figure 24B:
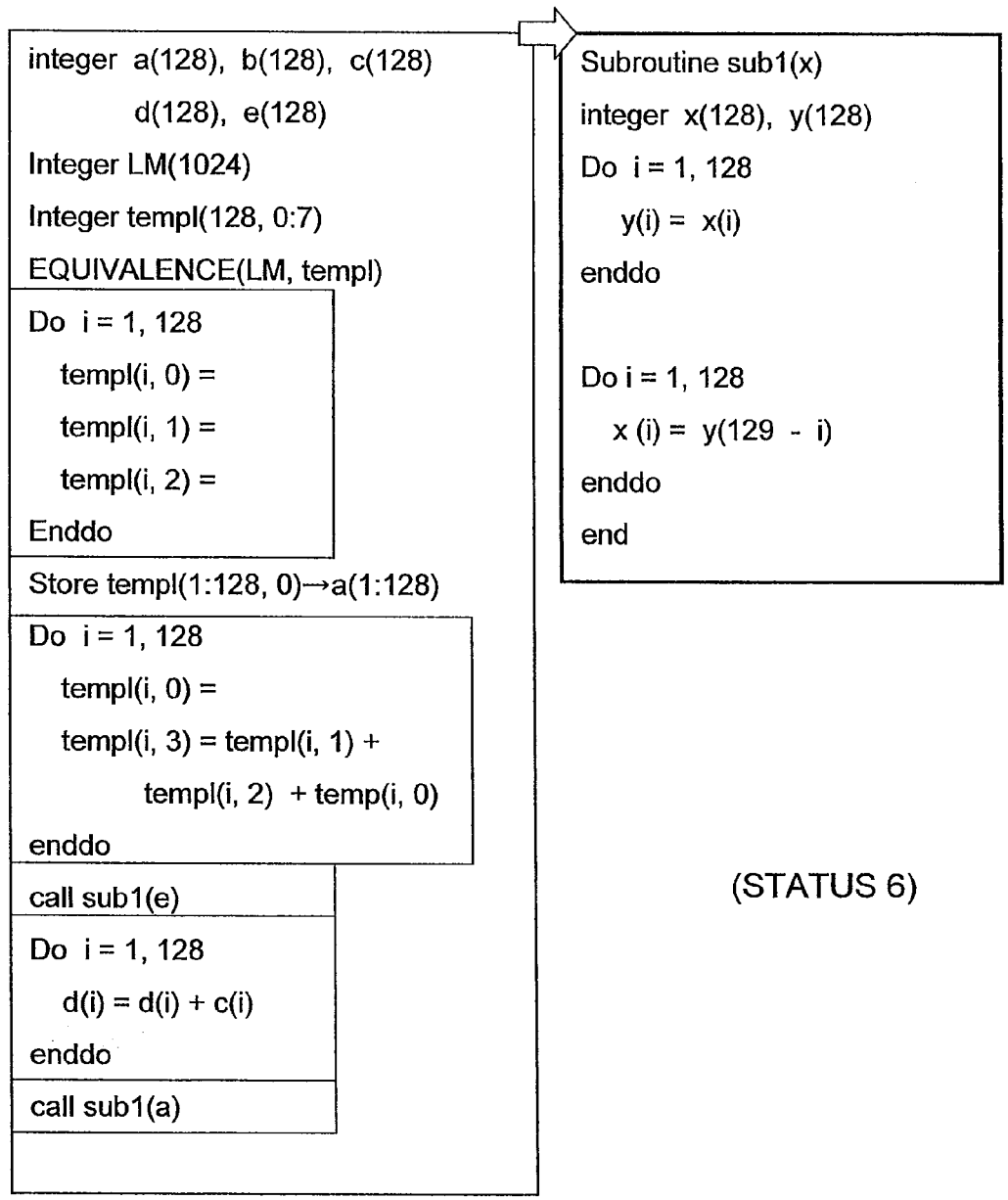

FIGS. 24A and 24B illustrate a status (status 6) of analysis of the subroutine. Arguments of the subroutine and the number of blocks necessary for processing in a subroutine are analyzed. In the illustrated example, the subroutine sub 1 uses an argument array x and an array y, which is an automatic variable. In other words, total of two blocks, one block for the argument and one block for the internal processing, are necessary.

Figure 25A:
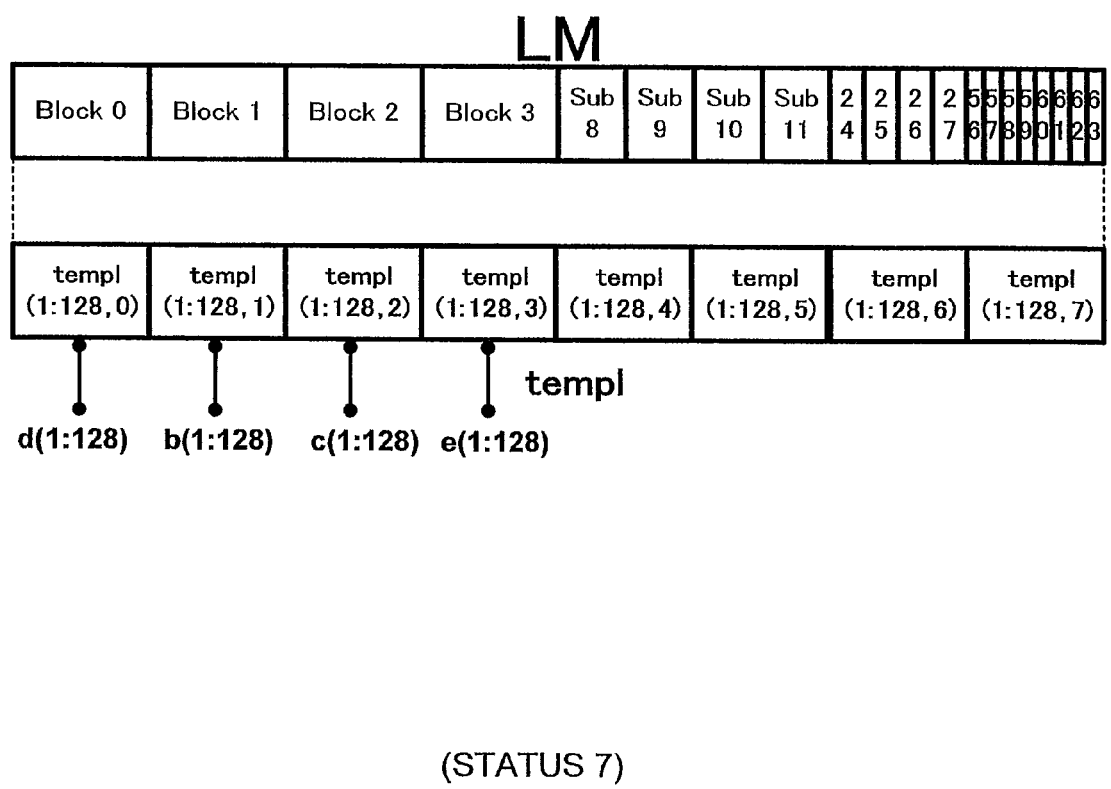

FIGS. 25A and 25B illustrate a status (status 7) of conversion to a template array by using a block specification variable in the subroutine. On this occasion, as described before, the subroutine may be called from a plurality of locations, and hence if the block specification dimension of the template array is specified by a constant, restriction on the memory management increases. Therefore, the block specification variable block_no1 is used to convert the template array so that the template can be placed at an arbitrary location.

Figure 26A:
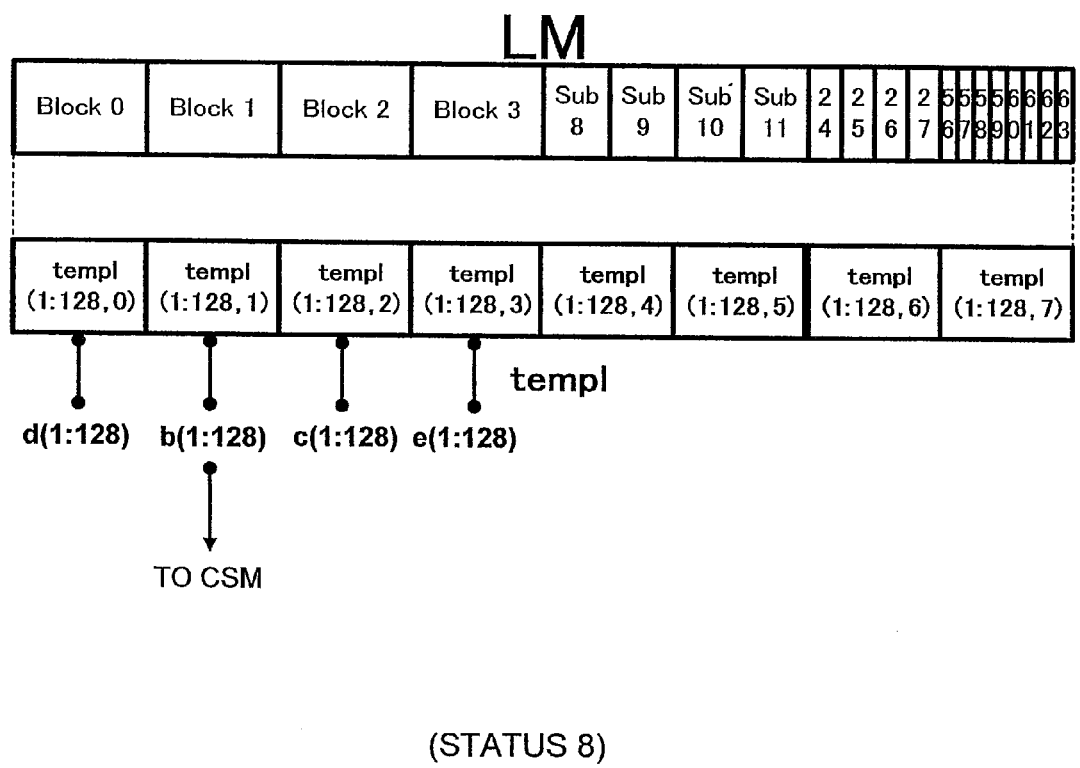
FIGS. 26A and 26B are explanatory diagrams describing the specific example of creation of the code image (status 8) according to the embodiment of this invention.
Figure 26B:
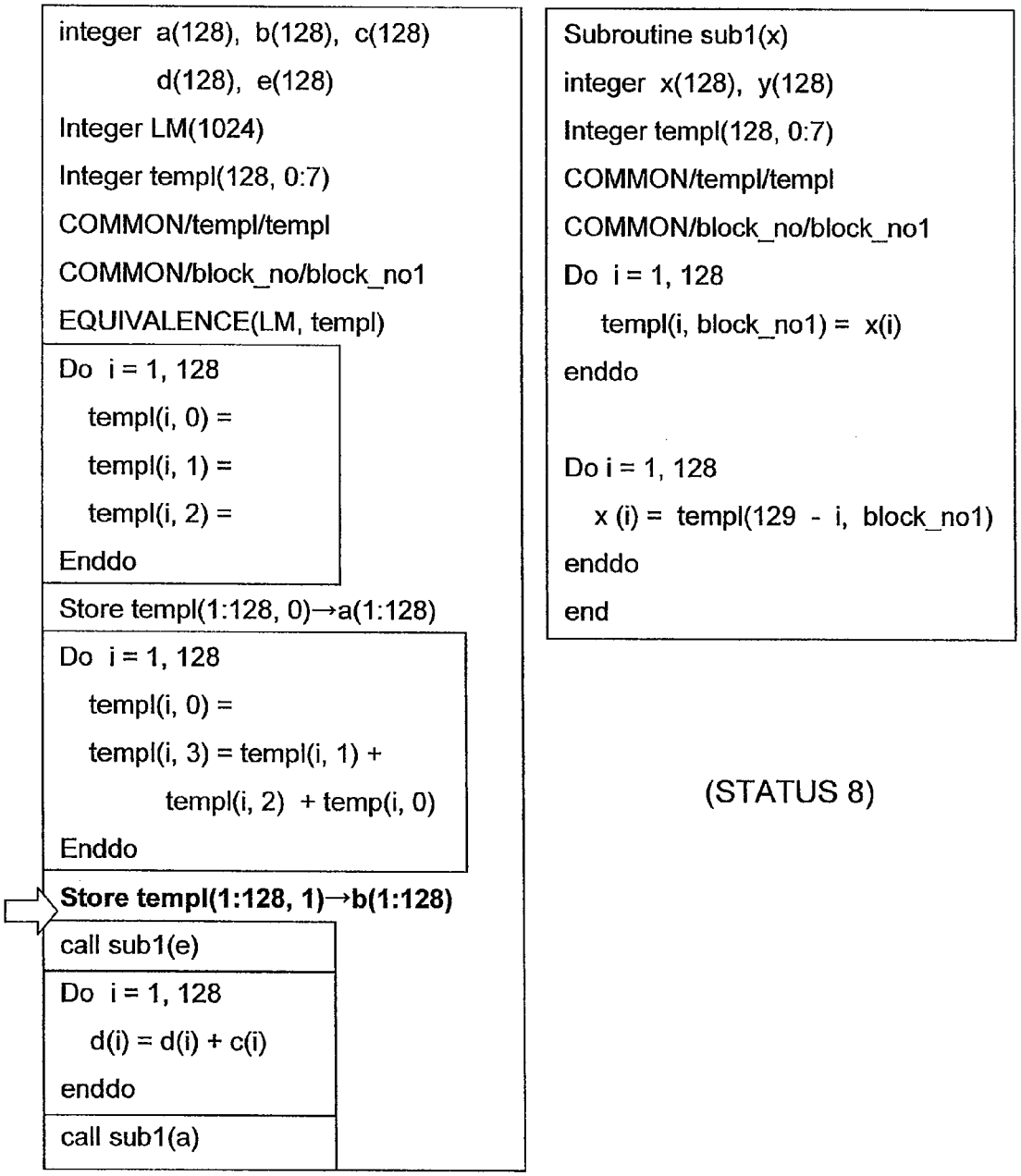

FIGS. 26A and 26B illustrate a status (status 8) of securing a block for the subroutine processing. The analysis inside the subroutine has already been finished, and the number of blocks necessary in the subroutine has been known, and hence the necessary number of blocks are freed upon the subroutine call, thereby securing the blocks for the subroutine processing. When the necessary number of blocks are not available, the data which has already been loaded is unloaded. The data to be unloaded is determined according to the unloading priority.

Specifically, in this subroutine, the one argument block and the one block for the internal processing are necessary. The arrays b, c, d, and e are loaded on the memory, and the array e is used for the argument. Thus, it is necessary to free one block for the internal processing. According to the unloading priority, the arrays c and d are to be used immediately, and hence the array b is to be unloaded.

Figure 27A:
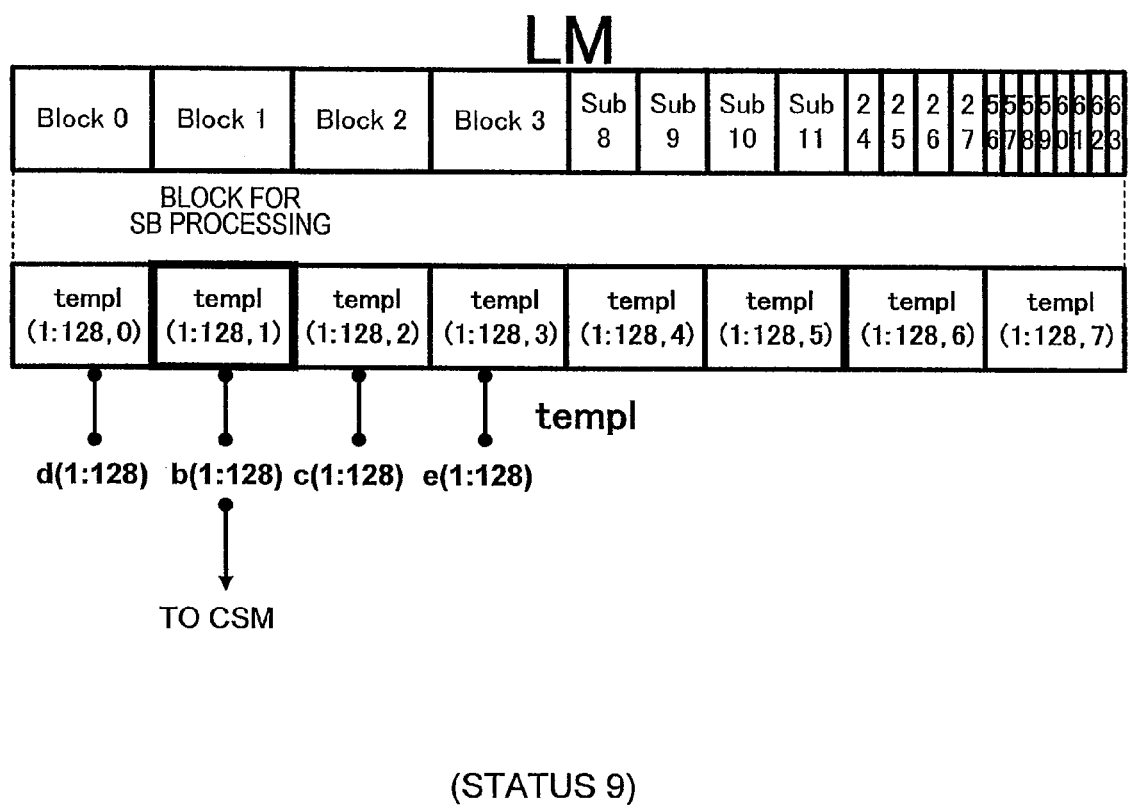

FIGS. 27A and 27B illustrate a status (status 9) of setting of the block specification variable. For the array for the internal processing used in the subroutine, an arbitrary block can be used according to the block specification variable block_no1. Thus, the block number assigned to the array variable for the internal processing is set to the specification variable.

Figure 28A:
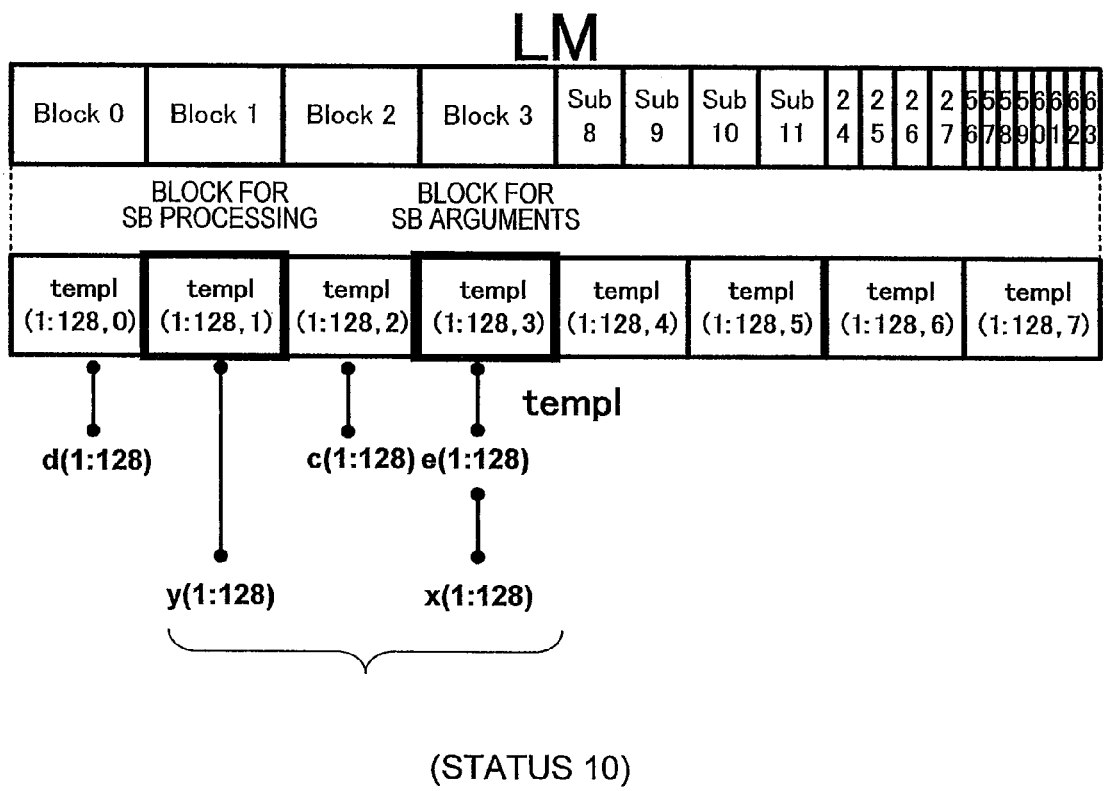
FIGS. 28A and 28B are explanatory diagrams describing the specific example of creation of the code image (status 10) according to the embodiment of this invention.
Figure 28B:
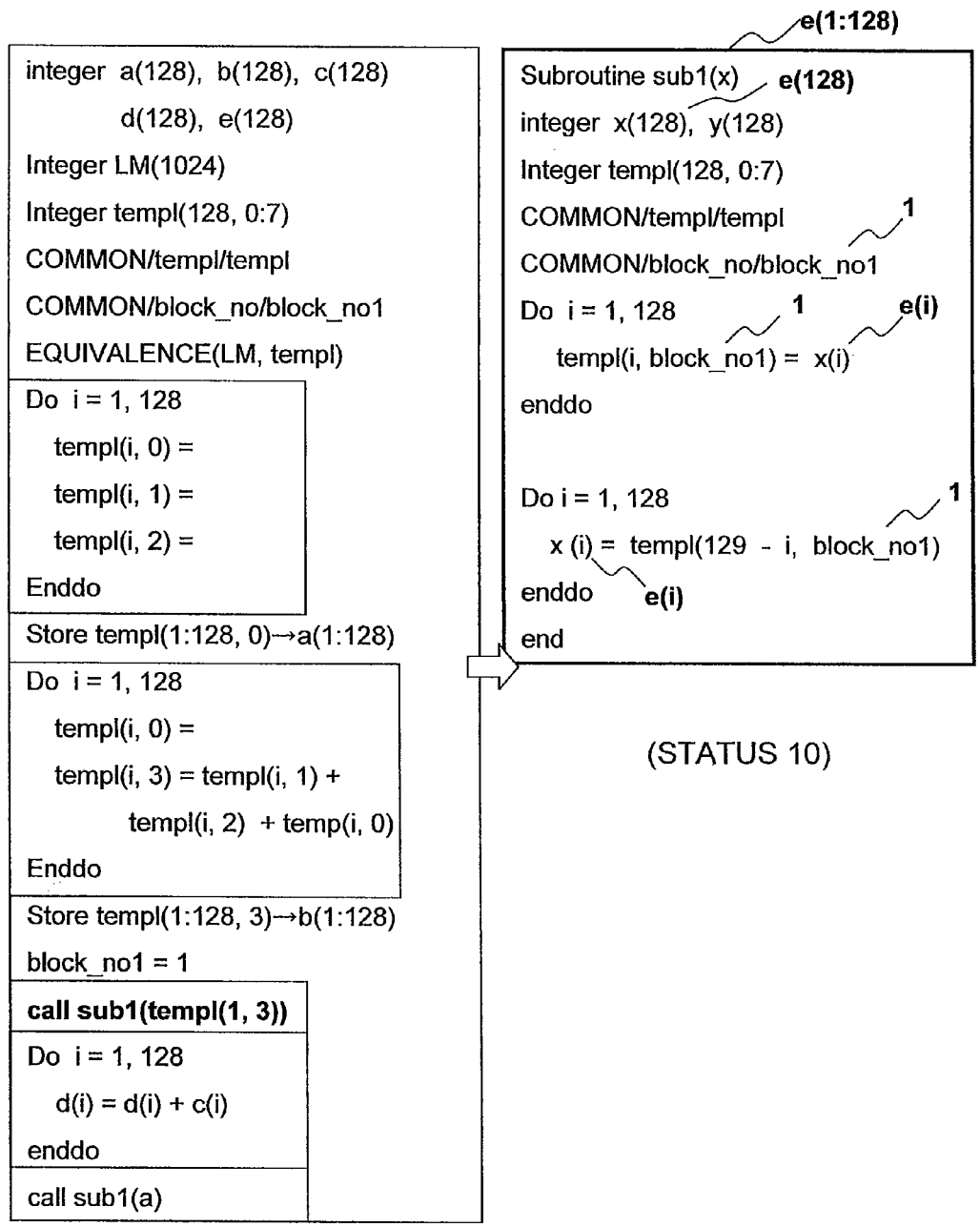

FIGS. 28A and 28B illustrate a status (status 10) of the execution of the subroutine. According to the block specification variable set upon the subroutine call, a block to be used is determined. In other words, the block 1 is assigned to the array y for the internal processing, and the block 3 is assigned to the array x for the argument. In the subroutine, by using the specified blocks, the processing of the subroutine is carried out.

Figure 29A:
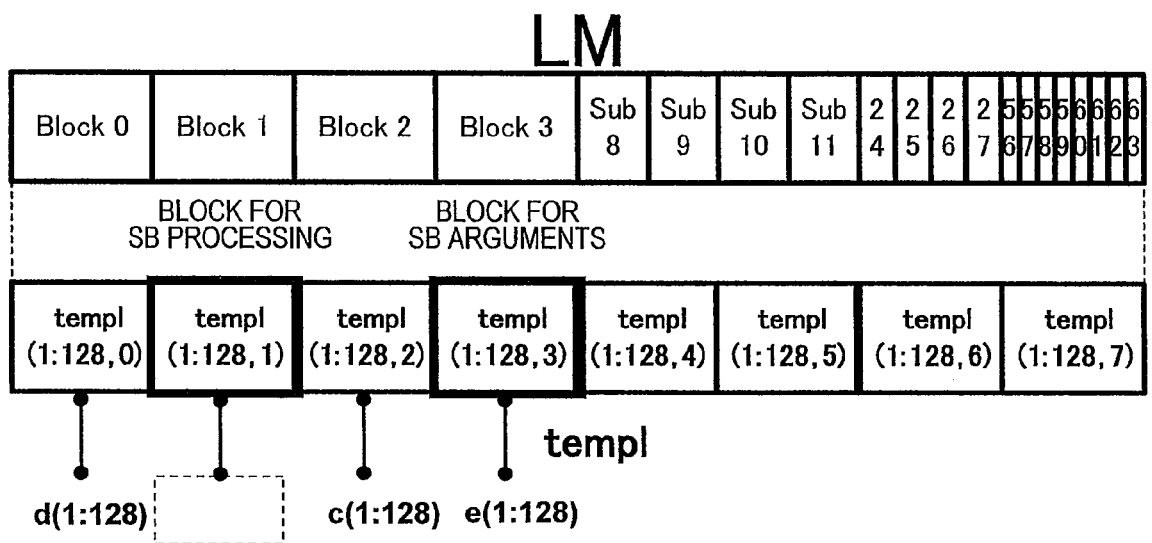

FIGS. 29A and 29B illustrate a status (status 11 of the end of the execution of the subroutine. After the processing of the subroutine, the block for the internal processing is set to NULL. The block for the argument is returned to the original array received as the argument.

Figure 30A:
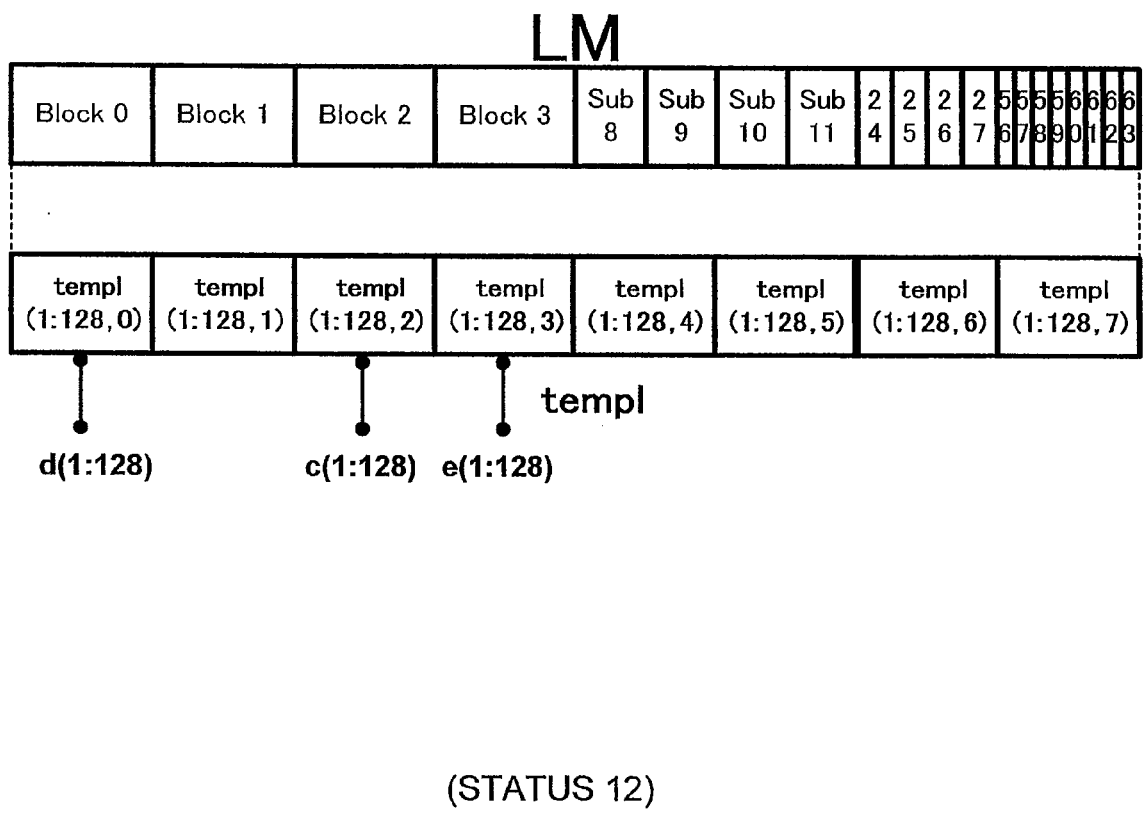
FIGS. 30A and 30B are explanatory diagrams describing the specific example of creation of the code image (status 12) according to the embodiment of this invention.
Figure 30B:

FIGS. 30A and 30B illustrate a status (status 12) of conversion to the template array. As the status illustrated in the status 3 (FIGS. 21A and 21B) and the status 5 (FIGS. 23A and 23B), the array which is to be loaded and used on the local memory is converted into the newly defined template array.

Figure 31A:
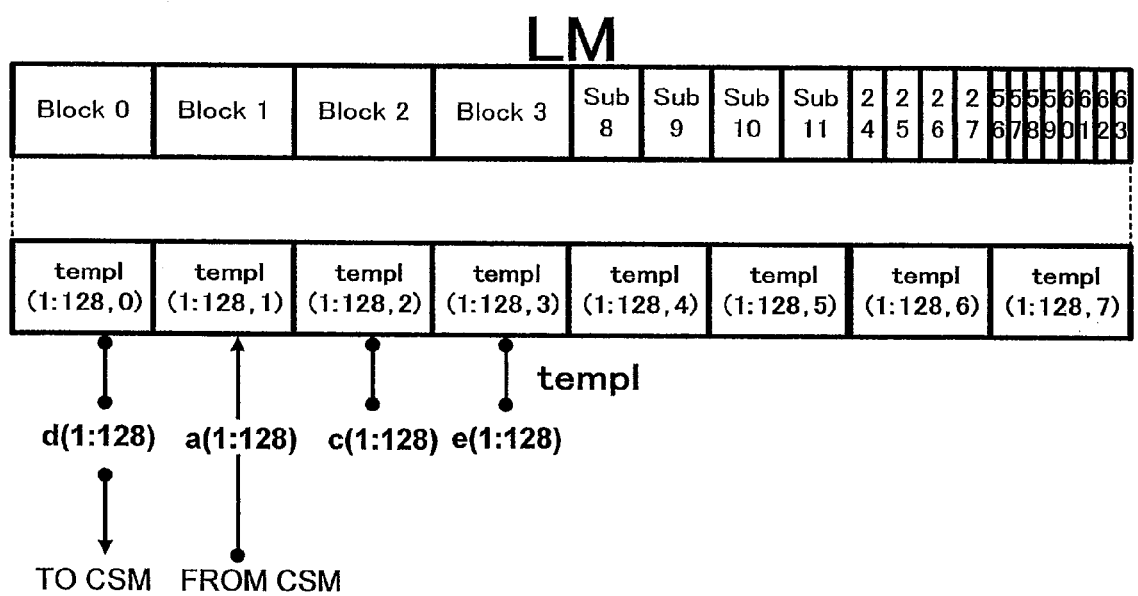

FIGS. 31A and 31B illustrate a status (status 13) of securing a block for the subroutine processing. The analysis inside the subroutine has already been finished, and the number of blocks necessary in the subroutine has been known, and hence the necessary number of blocks are freed upon the subroutine call, thereby securing the block for the subroutine processing. When the necessary number of blocks are not available, the data which has already been loaded is unloaded. The data to be unloaded is determined according to the unloading priority.

Specifically, for the next macro task (subroutine call), it is necessary to free one block for the internal processing for the subroutine. Out of the arrays d, a, c, and e loaded on the local memory, the array a is used as the argument of the subroutine. The unloading priorities of the arrays d, c, and e are the same, and thus, the array d which is stored in the block 0 having the smallest block number is to be unloaded. Moreover, it is known that the array a is necessary in the next macro task, and hence the array a is transferred by the data transfer unit to the block 1 which is free in the local memory.

Figure 32A:
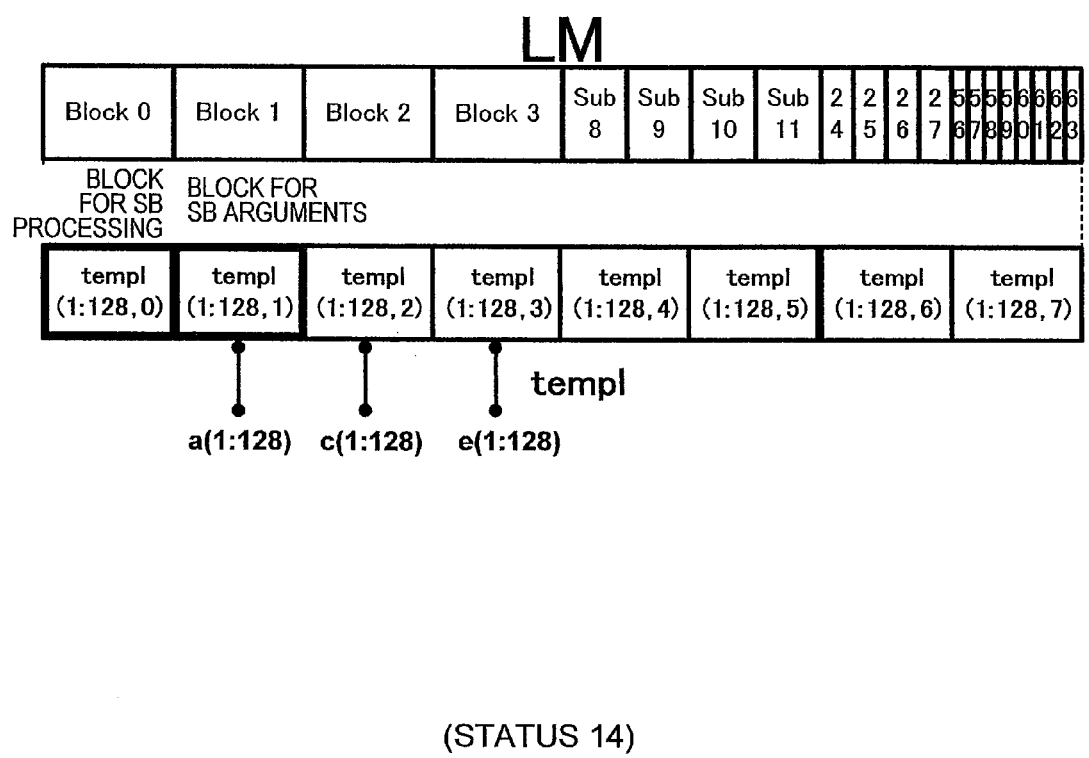

FIGS. 32A and 32B illustrate a status (status 14) of setting of the block specification variable. For the array for the internal processing used in the subroutine, an arbitrary block can be used according to the block specification variable bloc-k_no1. Thus, upon calling the subroutine, the block number assigned to the array variable for the internal processing is set to the specification variable. A block number different from the black number upon the previous subroutine call (status 9 illustrated in FIG. 27B) can be set.

Figure 33A:
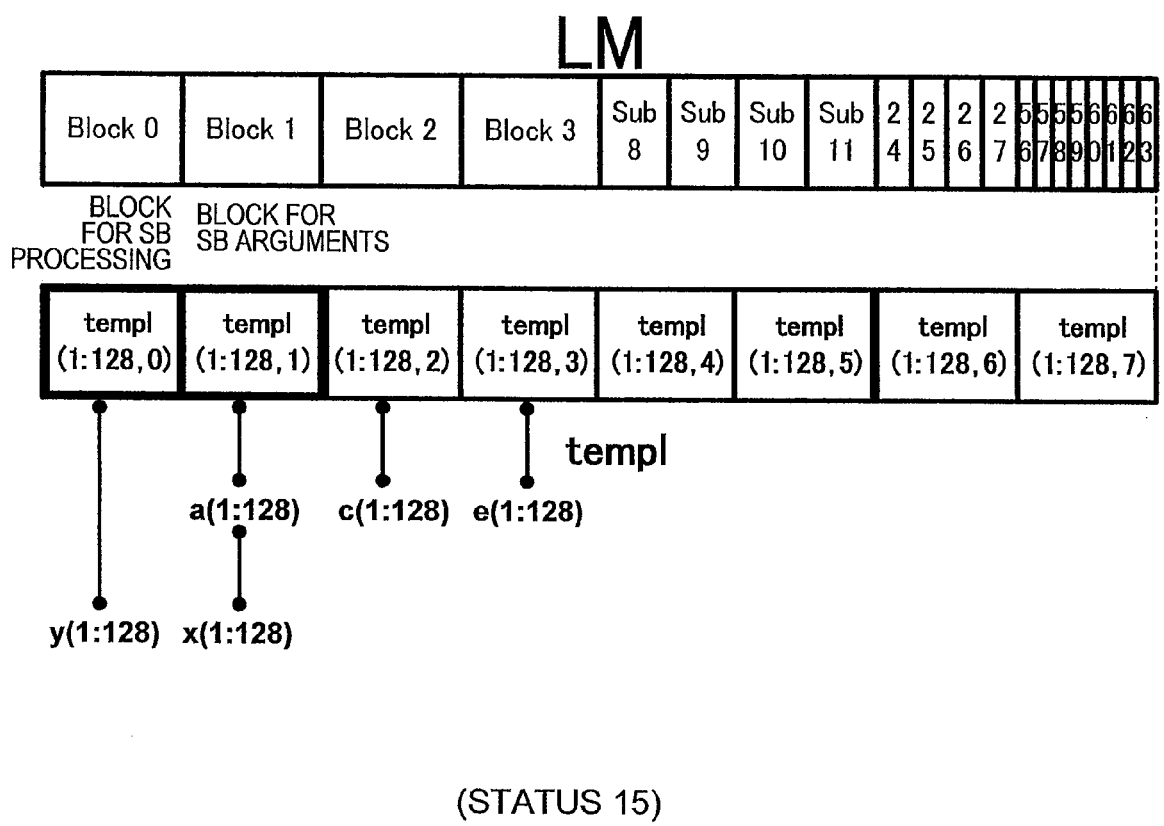

FIGS. 33A and 33B illustrate a status (status 15) of the execution of the subroutine. According to the block specification variable set upon the subroutine call, a block to be used is determined. In other words, the block 0 is assigned to the array y for the internal processing, and the block 1 is assigned to the array x for the argument. In the subroutine, by using the specified blocks, the processing of the subroutine is carried out. The processing is carried out in the area different from the area during the previous subroutine call (status 10 illustrated in FIG. 28A).

Figure 34A:
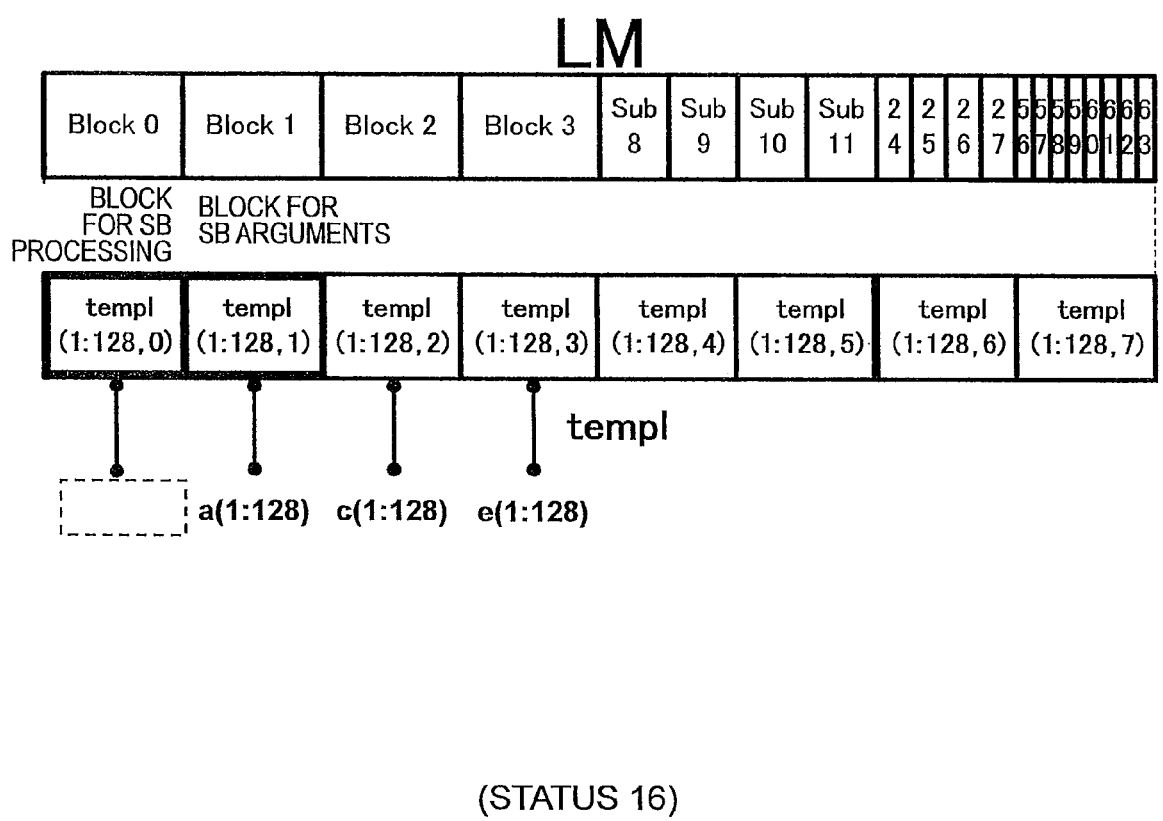

FIGS. 34A and 34B illustrate a status (status 16) of the end of the execution of the subroutine. A code illustrated in FIG. 34B is a code when the compilation has been completed. After the processing of the subroutine, the block for the internal processing is set to NULL. The block for the argument is returned to the original array received as the argument.

INDUSTRIAL APPLICABILITY

This invention can be applied to management of a memory area of a memory used by processors, and particularly to management of a memory area of a memory used by multi-task processors.

The invention claimed is:

1. A memory management method of managing a memory area of a memory used by a processor,
the processor being connected to the memory that stores data accessed while a task is being executed,
the memory management method comprising the steps of:
dividing the memory area of the memory into a plurality of first size blocks;
creating a plurality of second size blocks by further dividing at least one of the plurality of the first size blocks into a plurality of second size blocks each of which is an integer fraction of the first size blocks so that the second size blocks are assigned to a continuous area and the memory includes both of at least one of the plurality of first size blocks and the plurality of second size blocks;
selecting one of the first size blocks and the second size blocks matching a size of the data accessed while the task is being executed; and
storing the data accessed while the task is being executed in the selected block.

2. The memory management method according to claim 1, wherein the memory area of the memory is divided into the blocks each having a size determined based on information obtained by analysis of a program including the task.

3. The memory management method according to claim 1, further comprising the steps of:
storing, by a data transfer module, the data in the selected block after determining to assign the selected block to the data;
reading, by the data transfer module, the data stored in the selected block by a release timing of the selected block; and
storing the data in another memory.

4. The memory management method according to claim 1, further comprising the steps of:
assigning, to each of the blocks, a template of n+1 dimensions selected so as to match the array data accessed during the task in a case where the data accessed during the task includes array data of n dimensions; and assigning, to the each of the blocks, the templates different in value of the added dimension so that a different block is accessed according to the value of the added dimension in a case where a block for storing the data is specified.

5. A memory management method of managing a memory area of a memory by a processor, the processor being connected to the memory that stores data accessed while a program is being executed, the memory management method comprising the steps of:

dividing the memory area of the memory into a plurality of first size blocks;

creating a plurality of second size blocks by further dividing at least one of the plurality of the first size blocks into a plurality of second size blocks each of which is an integer fraction of the first size so that the second size blocks are assigned to a continuous area and the memory includes both of at least one of the first size blocks and the plurality of second size blocks;

assigning templates having a plurality of shapes and sizes determined based on information obtained by analysis of the program to one of the first size blocks and the second size blocks having matching sizes; and storing, in at least one of the assigned templates, data having a shape and size matching the plurality of shapes and sizes of the assigned template.

6. The memory management method according to claim 5, wherein the step of assigning the templates includes the steps of:

assigning, from a plurality of kinds of the templates which can be assigned to the respective blocks, a template which has dimensions obtained by adding one to dimensions of array data accessed by the program, and which has upper bounds of the respective dimensions equal to or larger than upper bounds of the respective dimensions of the array data accessed by the program; and assigning a plurality of the templates to a plurality of the blocks so that a different block is accessed according to a value of the added dimension.

7. A computer, comprising:

a processor; and a memory that stores data accessed by the processor, wherein:

a memory area of the memory is divided into blocks having a plurality of sizes determined based on information obtained by analysis of a program executed by the processor;

a shape and size of a template assigned to each of the blocks is determined based on the information obtained by the analysis of the program; and the processor is configured to:

divide the memory area of the memory into a plurality of first size blocks determined based on the information obtained by the analysis of the program executed by the processor;

create a plurality of second size blocks by further dividing at least one of the plurality of the first size blocks into a plurality of second size blocks each of which is an integer fraction of the first size blocks so that the second size blocks are assigned to a continuous area and the memory includes both of at least one of the first size blocks and the plurality of second size blocks;

assign the template having a shape and size determined based on the information obtained by the analysis of the program to one of the first size blocks and the second size blocks having a matching size; and store, in the assigned template, data having a shape and size matching the shape and size of the assigned template.

8. The computer according to claim 7 wherein:

a template, which has dimensions obtained by adding one to dimensions of array data accessed by the program, and which has upper bounds of the respective dimensions other than the added dimension equal to or larger than upper bounds of the respective dimensions of the array data accessed by the program, is assigned; and a plurality of the templates are assigned to a plurality of the blocks so that a different block is accessed according to a value of the added dimension.

9. A method of creating a program executable by a processor, comprising the steps of:

analyzing information of a source program by a compiler;

dividing the memory area of a memory into a plurality of first size blocks determined based on the information obtained by the analysis of the source program;

creating a plurality of second size blocks by further dividing at least one of the plurality of the first size blocks into a plurality of second size blocks each of which is an integer fraction of the first size so that the second size blocks are assigned to a continuous area so that the memory includes both of at least one of the first size blocks and the plurality of second size blocks;

identifying data necessary for executing respective tasks included in the source program;

determining timing of reading/writing the necessary data from/to the memory according to timing of executing the tasks; and adding an instruction to assign one of the first size blocks and the second size blocks to the executable program compiled by the determined timing of writing the data.

10. The method of creating an executable program according to claim 9, further comprising the steps of:

determining an area to be released and timing of releasing the area based on the information obtained by the analysis of the source program; and adding an instruction to read the data written in the memory by the determined timing of the executable program to be compiled in order to release the assigned area.

11. The method of creating an executable program according to claim 10, further comprising a step of adding, to the executable program:

an instruction to store, by data transfer module, the data in the assigned blocks after assigning blocks; and an instruction to read, by the data transfer module, by the timing of releasing the assigned blocks, the data stored in the assigned blocks, and store the data in another memory.

12. The method of creating an executable program according to claim 9, wherein the information obtained by the analyzing the source program includes at least one of information on the data accessed by the source program, information on timing in which the data is accessed next, and information on the processor that accesses the data.

13. The method of creating an executable program according to claim 9, wherein:

the processor is a multi-processor comprising a plurality of processor cores; and the method further includes the steps of:

determining when and by which processor the tasks are executed; and adding an instruction to assign the tasks to the determined processor to the program to be compiled.

14. The method of creating an executable program according to claim 9, further comprising a step of dividing the source program so that the data accessed during the tasks is accommodated in one of the blocks.

15. The method of creating an executable program according to claim 14, wherein:
the source program includes nested loops; and
the method further comprises the steps of:
judging whether data accessed during a task created by dividing an outer loop is accommodated in the one of the blocks; and
further dividing an inner loop to change a size of the data in a case where the data accessed during the task created by dividing the outer loop is not accommodated in the one of the blocks.

16. The method of creating an executable program according to claim 9, further including the steps of:
assigning, in a case where the data accessed by the source program includes array data in n dimensions, a template in n+1 dimensions selected so as to match the array data accessed by the source program; and
assigning, in a case where an area for storing the data is specified, a plurality of the templates to a plurality of the areas so that the area to be accessed is specified according to a value of the added dimension.

17. A non-transitory machine readable medium, containing at least one sequence of instructions that causes a processor to execute a method comprising the steps of:
analyzing a source program;
dividing the memory area of the memory into a plurality of first size blocks determined based on information obtained the analysis of the source program;
creating a plurality of second size blocks by further dividing at least a part of the plurality of the first size blocks into a plurality of second size blocks each of which is an integer fraction of one of the first size blocks so that the second size blocks are assigned to a continuous area and the memory includes both of at least one of the first size blocks and the plurality of second size blocks;
identifying data necessary for executing respective tasks included in an executable program;
determining timing of reading/writing of the necessary data from/to a memory according to timing of executing the tasks; and
adding an instruction to assign one of the first size blocks and the second size blocks by the determined timing of writing the data.

* * * * *